United States Patent
Steenstrup et al.

(10) Patent No.: US 11,947,004 B2
(45) Date of Patent: *Apr. 2, 2024

(54) MULTIFAN SURVEY SYSTEM AND METHOD

(71) Applicant: R2SONIC, LLC, Austin, TX (US)

(72) Inventors: Jens Steenstrup, Austin, TX (US); Christopher Tiemann, Austin, TX (US); Mark Chun, Austin, TX (US); Kirk Hobart, Austin, TX (US)

(73) Assignee: R3VOX LTD (MT)

( * ) Notice: Subject to any disclaimer, the term of this patent is extended or adjusted under 35 U.S.C. 154(b) by 767 days.

This patent is subject to a terminal disclaimer.

(21) Appl. No.: 16/864,252

(22) Filed: May 1, 2020

(65) Prior Publication Data

US 2020/0292700 A1 Sep. 17, 2020

Related U.S. Application Data

(63) Continuation-in-part of application No. 16/133,547, filed on Sep. 17, 2018, now Pat. No. 11,428,809, which is a continuation of application No. 15/802,307, filed on Nov. 2, 2017, now Pat. No. 10,094,924, which is a continuation of application No. 15/495,362, filed on Apr. 24, 2017, now Pat. No. 9,817,117, which is a continuation-in-part of application No. 15/476,137, filed on Mar. 31, 2017, now Pat. No. 10,132,924.

(60) Provisional application No. 62/372,231, filed on Aug. 8, 2016, provisional application No. 62/329,631, filed on Apr. 29, 2016.

(51) Int. Cl.
*G01S 15/89* (2006.01)

(52) U.S. Cl.
CPC .................................. *G01S 15/89* (2013.01)

(58) Field of Classification Search
None
See application file for complete search history.

(56) References Cited

U.S. PATENT DOCUMENTS

| | | | |
|---|---|---|---|
| 3,144,631 | A | 8/1964 | Lustig et al. |
| 4,403,314 | A | 9/1983 | Tournois |
| 4,611,313 | A | 9/1986 | Ziese |
| 5,377,163 | A | 12/1994 | Simpson |
| 5,483,499 | A | 1/1996 | Brumley et al. |
| 7,092,440 | B1 | 8/2006 | Dress, Jr. et al. |
| 8,305,841 | B2 | 11/2012 | Riordan et al. |
| 9,244,168 | B2 | 1/2016 | Proctor |
| 2012/0081996 | A1 | 4/2012 | Frivik et al. |
| 2012/0327741 | A1 | 12/2012 | Pearce |
| 2015/0006085 | A1 | 1/2015 | Bisley et al. |

(Continued)

OTHER PUBLICATIONS

Larry A. Mayer; Frontiers in Seafloor Mapping and Visualization, Marine Geophysical Researches, Kluwer Academic Publishers, DO, vol. 27, No. 1 Mar. 2006, pp. 7-17, XP019403134, ISSN;1573-0581, DOI;10.1007/S11001-005-0267-X.

(Continued)

*Primary Examiner* — Hovhannes Baghdasaryan
(74) *Attorney, Agent, or Firm* — Paul D. Chancellor; Ocean Law

(57) ABSTRACT

A survey system including a multibeam echo sounder having a single projector array and a single hydrophone array constructs a multi-component message for ensonifying multiple fans and deconstructs a corresponding message echo for use in analyzing the returns from each fan.

21 Claims, 24 Drawing Sheets

(56) References Cited

U.S. PATENT DOCUMENTS

2016/0018516 A1    1/2016   Brown et al.
2016/0025882 A1    1/2016   Schneider et al.

OTHER PUBLICATIONS

Jaffe J S et al.: "Multibeam Imaging Using Spatially Variant Insonification", The Journal of the Acoustical Society of America, American Institute of Physics for the Accoustical Society of America, New York, NY, US, vol. 83, No. 4, Apr. 1, 1988, pp. 1458-1464, XP001221875, ISSN; 0001-4966, DOI;10.1121/1.395953.
Stytsenko Eugene et al.: "A mid-range 3D sonar", 2013 MTS/IEEE Oceans-Bergen, IEEE, Jun. 10, 2013, pp. 1-5, XP032487863, DOI; 10.1109/OCEANS-BERGEN, 2013.6607998.

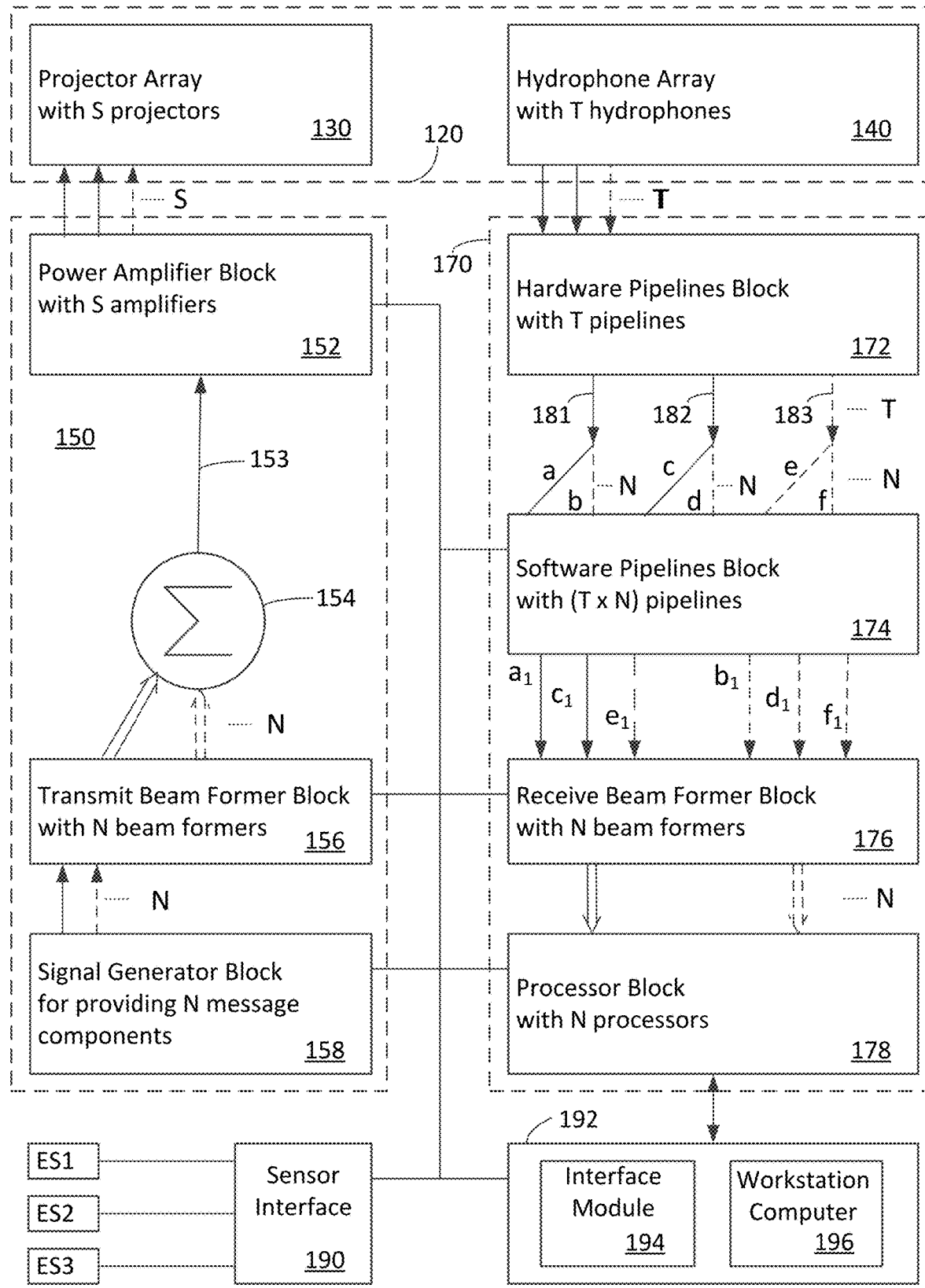

| SYMBOL | DESCRIPTION |
|---|---|
| AD | Analog to digital converter |
| BF | Beamformer |
| ESx | Sensor x |
| MF | Match filter |
| PA | Power amplifier |
| PRO | Processor |
| SG | Signal generator |
| ▽ | Amplifier |
| ⌐⌐ | Antialiasing filter |
| ⌐⌐ | Band pass filter |
| ↓ | Decimator |
| ⊗ | Mixer |

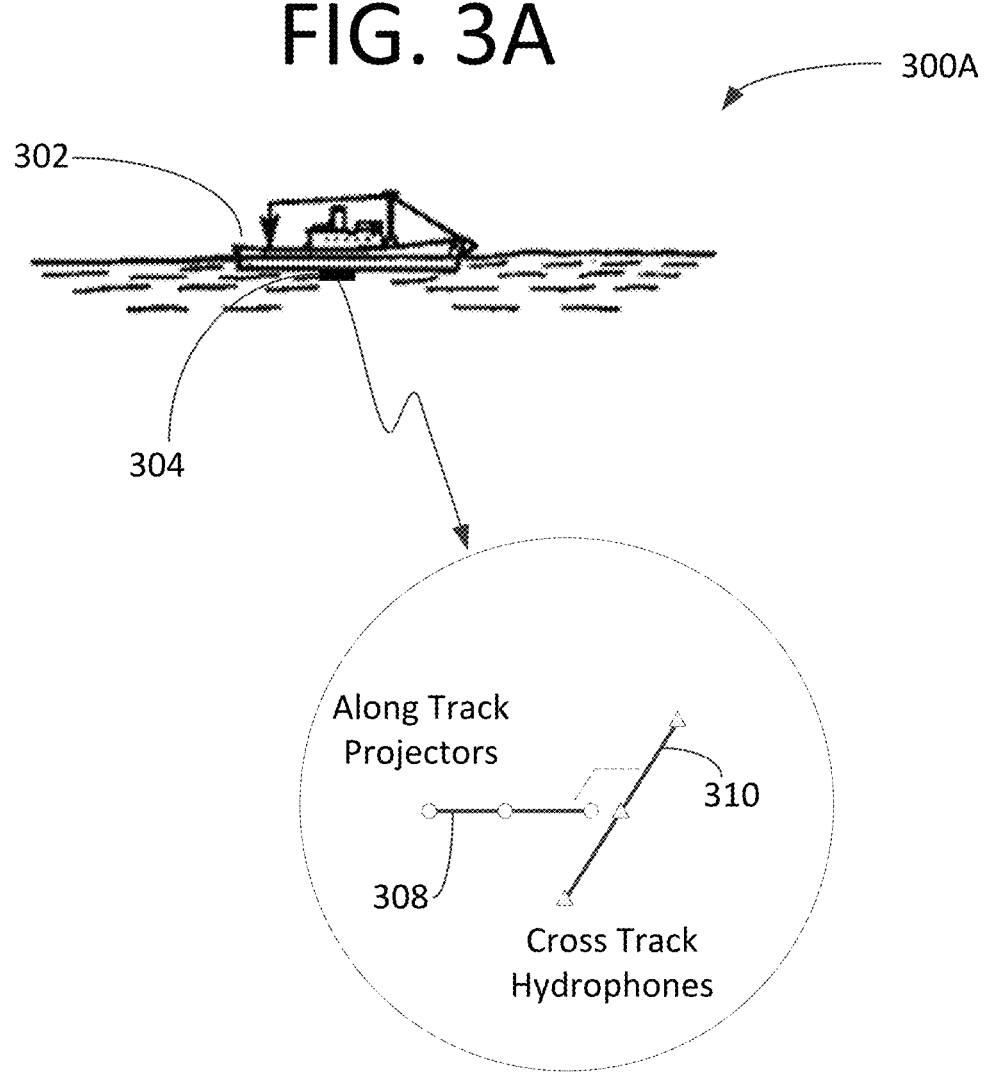

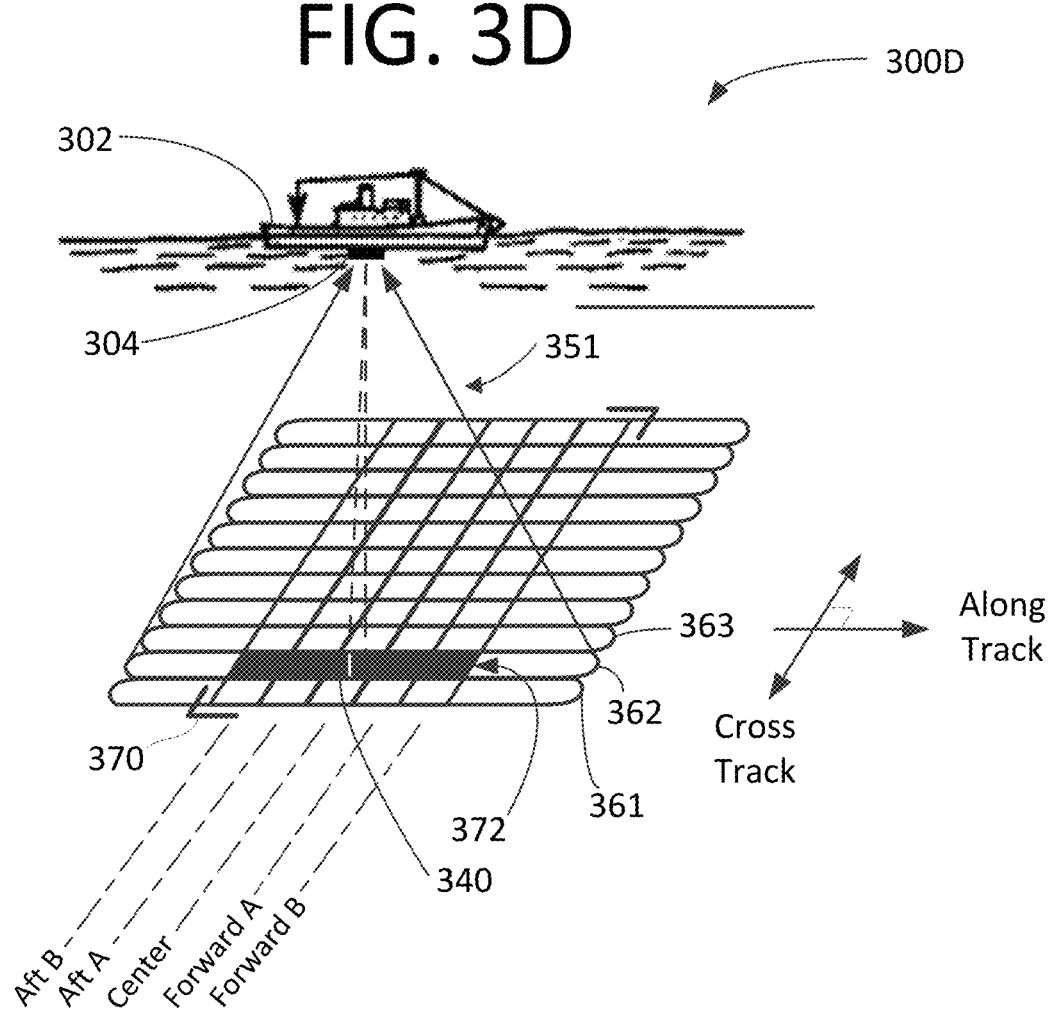

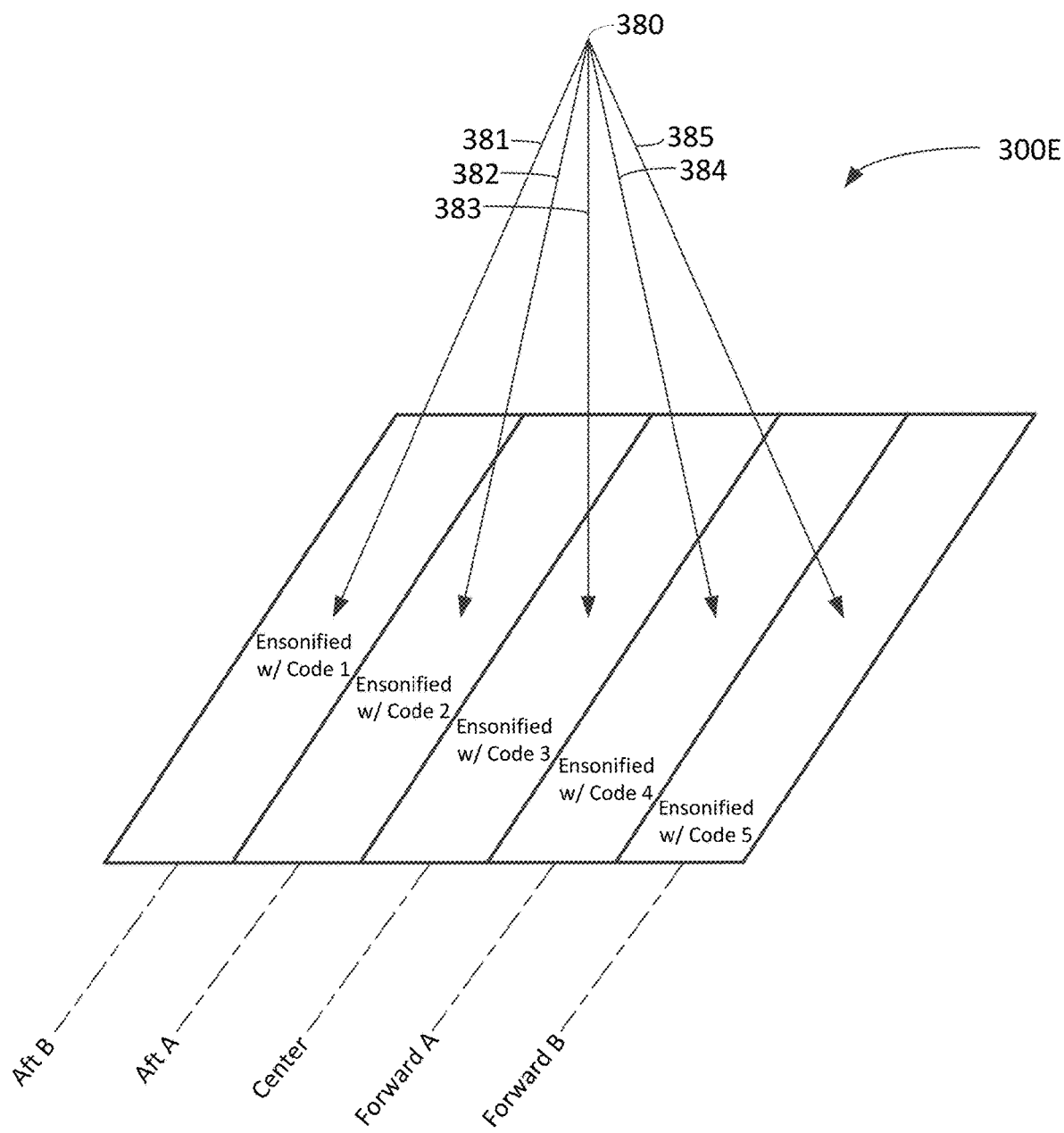

FIG. 4

| CODED SIGNALS & SEQUENCES | Spread Spectrum | | Noise-Like | Directionally Coded | Frequency Separable |
|---|---|---|---|---|---|
| | Frequency Hopping | Direct Sequence | | | |
| Costas | X | | | | |
| Reed Solomon | X | | | | |
| Barker | | X | | | |
| Gold | | X | | | |
| Maximum Length | | X | | | |
| Kasami | | X | | | |
| Walsh | | X | | | |
| Gausian Noise | | | X | | |
| Deterministic Chaos | | | X | | |
| FM Sweeps | | | | X | |
| CW | | | | | X |

500A

| Fan Inventory | Fan Location | Signal Type /Signal | Code | Spectrogram Of Transmitted Message Component |
|---|---|---|---|---|
| Fan 1 | Aft B | OSS/OSS1 | {1,2,4,3} |  |
| Fan 2 | Aft A | OSS/OSS2 | {1,3,4,2} |  |
| Fan 3 | Center | OSS/OSS3 | {1,4,2,3} |  |
| Fan 4 | Forward A | OSS/OSS4 | {2,1,3,4} |  |
| Fan 5 | Forward B | OSS/OSS5 | {2,3,1,4} |  |

MULTIFAN SURVEY SYSTEM AND METHOD

PRIORITY APPLICATION AND INCORPORATION BY REFERENCE

This application is a continuation in part of U.S. patent application Ser. No. 16/133,547 filed Sep. 17, 2018 which is a continuation of U.S. patent application Ser. No. 15/802, 307 filed Nov. 2, 2017 now U.S. Pat. No. 10,094,924 which is a continuation of U.S. patent application Ser. No. 15/495, 362 filed Apr. 24, 2017 now U.S. Pat. No. 9,817,117, which is a continuation-in-part of U.S. patent application Ser. No. 15/476,137 filed Mar. 31, 2017 now U.S. Pat. No. 10,132, 924 which claims the benefit of U.S. Prov. Pat. App. No. 62/329,631 filed Apr. 29, 2016 and this application claims the benefit of 62/372,231 filed Aug. 8, 2016 all of which are included herein by reference, in their entirety and for all purposes. This application incorporates by reference, in their entireties and for all purposes, the disclosures of U.S. Pat. No. 3,144,631 concerning Mills Cross sonar, U.S. Pat. No. 8,305,841 concerning sonar used for mapping seafloor topography, U.S. Pat. No. 7,092,440 concerning spread spectrum communications techniques, U.S. Pat. No. 5,483, 499 concerning Doppler frequency estimation, and U.S. Pat. No. 9,244,168 concerning frequency burst sonar.

BACKGROUND OF THE INVENTION

Field of the Invention

The present invention relates to underwater acoustical systems, methods for using underwater acoustical systems, and methods for processing and using the data they produce. In particular, the invention relates to survey systems including sonar systems capable of multifan ensonification of waterbody bottoms.

Discussion of the Related Art

A month after the Titanic struck an iceberg in 1912, English meteorologist Lewis Richardson filed a patent at the British Patent Office for an underwater ranging device. Modern day successors to Richardson's invention are often referred to as SONAR (sound navigation and ranging) devices. Among these devices are ones using transducer arrays to project sound or pressure waves through a liquid medium and transducer arrays to receive corresponding echoes from features that scatter and/or reflect impinging waves.

Information about these features and their environment can be derived from the echoes. For example, bathymetric surveys provide information about the depth of scattering centers, water column surveys provide information about scattering centers in the water column, and seafloor characterization surveys provide information about scattering centers at the seafloor surface and below the seafloor surface. The diversity and quality of the information returned in echoes may be determined in part by the characteristics of the signal used to excite the projector transducers.

The cost of obtaining this information is strongly influenced by the timeframe during which manpower and equipment is required to acquire the information.

Although some progress towards improving data quality and diversity while reducing the time required to perform an underwater survey has been made, particularly through the use of multibeam echo sounders, long standing technological challenges and risks associated with building and testing costly new survey equipment present significant obstacles to further similar improvements.

SUMMARY OF THE INVENTION

The present invention provides a multifan survey system and method. Multifan survey operations may be useful in multiple survey tasks including bathymetry, water column monitoring, forward look survey, Doppler velocimetry, Doppler current profiling, and motion stabilization.

As disclosed herein, an array of projectors transmits a beam that ensonifies reflectors and an array of hydrophones receives echoes from these reflectors. The projected beam-pattern may be fan-shaped as it travels to reflectors in a zone or area of ensonification. This zone or area of ensonification may be an elongated pattern and may be referred to as a fan or swath. Echoes returned from this zone are processed to provide survey results. The multifan survey system of this invention is capable of ensonifying and processing echoes from multiple fans in a single transmit/receive ping cycle.

Surveys such as bathymetric surveys may benefit from multifan operation and related wider zones of ensonification with exemplary advantages including one or more of faster survey speeds, improved precision, and confidence from increased independent soundings, and multi-aspect imaging of targets.

Water column monitoring may benefit from multifan operation in a manner similar to bathymetric surveys due to enlarged per ping volumes of ensonification. Applications include counting biologics, finding plumes, quantifying pollutant concentration, and the like.

Forward Look Sonar (FLS) may benefit from multifan operation. For example where the sonar is rotated 90 degrees to face its fans-shaped beams forward. In particular, with each ping multiple FLS beams enable searching a large volume in front of the source. Volume imaging applications include obstacle avoidance, monitoring underwater construction, security and fisheries applications including biomass estimation, to name a few.

Doppler velocimetry may benefit from multifan operation with advantages including use of one or more of forward/backward steered transmit beams that allow for a Janus-like beam configuration. For example, a multi-beam echo sounder with multiple receive beams provides Doppler estimates like Doppler velocity log (DVL) estimates. When the source is stationary, a similar arrangement may serve as an acoustic Doppler current profiler (ADCP).

Motion stabilization such as three axis motion stabilization may benefit from multifan operation. For example, it is common practice to use pitch/roll measurements at the time of a ping to electronically steer angular corrections, based on a vertical reference, such that all pings report data from the same beam angles regardless of vessel motion. The use of multiple ensonified zones or fans may also support corrections along a 3rd axis which may be referred to as a yaw axis.

Because a multifan system is capable of ensonifying multiple fans using a single ping cycle, a means for discriminating echoes returned from a particular fan may rely on message component design and/or on filtering of returns in the receiver. Here, coded message components may be message components with properties allowing their decoding or discrimination from each other during receiver processing.

In an embodiment, the invention provides multifan equipment for survey operations such as bathymetry, water column monitoring, forward look sonar, Doppler velocimetry, Doppler current profiling, and motion stabilization, the multifan equipment comprising: a transmitter and a receiver of a multibeam echo sounder; the transmitter for constructing a message that includes N>=3 coded message components to excite projectors in a single projector array; each message component resulting in a particular projector array beam that ensonifies reflectors in a respective fan; and, following transmission of a message, the receiver for receiving ensonified reflector returns via hydrophones arranged in a single hydrophone array; wherein multiple hydrophone beams formed by the hydrophone array intersect the fans and fans are distinguished from each other using N filters.

In some survey system embodiments, each of the message components occupies a distinct frequency band without overlapping the frequency bands of other message components. This frequency separation of message components is a form of coding wherein techniques such as bandpass filtering or matched filtering can resolve the coded returns. In such embodiments, the message component frequency band may occupy less than one-half of the receiver operating frequency range.

In some survey system embodiments, two message components can occupy the same band or overlapping frequency bands. For example, if one coded message component is a frequency modulated (FM) sweep of increasing frequency, a second coded message component may be an FM sweep of decreasing frequency. In such embodiments, techniques including matched filtering can decode the return signals and associate them with particular fans. And, in such embodiments, the band occupied by the two message components may be less than one-half of the receiver operating frequency range, a majority of this range, or substantially all of this range.

In some survey system embodiments, the survey system further comprises: N plural signal generators in the transceiver transmitter, each signal generator for generating a respective one of the coded message components. Here, each signal may occupy a common frequency band shared by all message components. In some embodiments, the N coded message components include spread spectrum signals, for example frequency hopping codes or Barker codes. In these embodiments, techniques such as matched filtering may decode the return signals and separate returns from different fans. In some survey system embodiments, the survey system utilizes a set of differing frequency hopping codes, each code used to guide the selection of three or more frequencies characterizing each coded message component. In some survey system embodiments, the survey system utilizes a message component that includes sequential pulsed sinusoidal waveforms at three or more frequencies. And, in some survey system embodiments, Costas codes are used to guide the selection of frequencies.

BRIEF DESCRIPTION OF THE DRAWINGS

The present invention is described with reference to the accompanying figures. These figures, incorporated herein and forming part of the specification, illustrate embodiments of the invention and, together with the description, further serve to explain its principles enabling a person skilled in the relevant art to make and use the invention. The invention may include some or all of the features illustrated.

FIGS. 1B-F show embodiments of at least portions of the multibeam echo sounder system of FIG. 1A.

FIG. 1G shows a legend of selected symbols.

FIG. 3A shows a vessel equipped with a Mills cross type arrangement of arrays for use with the multibeam echo sounder system of FIG. 1A.

FIGS. 3B-F illustrate fan and multifan operations for use with the multibeam echo sounder system of FIG. 1A.

FIG. 4 shows a table of signal codes and sequences for use with the multibeam echo sounder system of FIG. 1A.

DETAILED DESCRIPTION OF THE PREFERRED EMBODIMENTS

The disclosure provided in the following pages describes examples of some embodiments of the invention. The designs, figures, and description are non-limiting examples of the embodiments they disclose. For example, other embodiments of the disclosed device and/or method may or may not include the features described herein. Moreover, described features, advantages or benefits may apply to only certain embodiments of the invention and should not be used to limit the disclosed invention.

As used herein, the term "coupled" includes direct and indirect connections. Moreover, where first and second devices are coupled, intervening devices including active devices may be located therebetween.

FIGS. 1A-E show a survey system including a multibeam echo sounder system and describe exemplary multibeam echo sounder embodiments. FIG. 1G shows a legend of selected symbols appearing on FIGS. 1C-F.

Figure 1A:
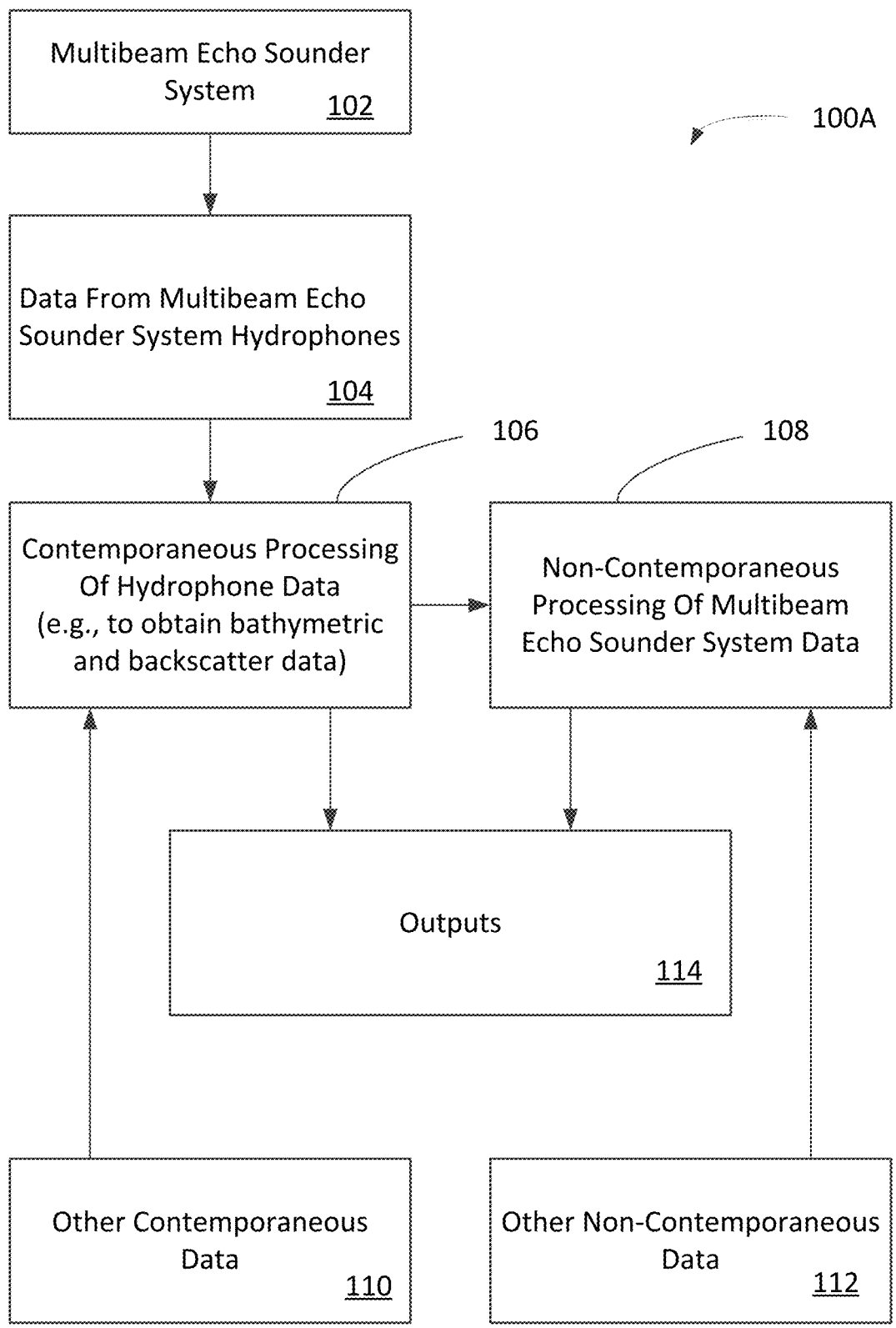
FIG. 1A shows a survey system including a multibeam echo sounder system of the present invention.

FIG. 1A shows a survey system in accordance with an embodiment of the present invention 100A. The survey system includes an echo sounder system such as a multibeam echo sounder system 102 which may be mounted on: a surface vehicle or vessel; a remotely operated vehicle; an autonomous underwater vehicle; stationary on a sea floor; or the like. As is further described below, echo sounder and/or survey system outputs 114 may be contemporaneous with echo sounder processing of hydrophone data as in some embodiments for bathymetry or non-contemporaneous with processing of hydrophone data as in some embodiments for waterbody bottom classification.

Data acquired by multibeam echo sounder systems 104 include data from echo sounder listening devices such as hydrophones (e.g., transducers) that receive echoes which are related to the acoustic/pressure waves emanating from the echo sounder projectors but have returned by virtue of an interaction with inhomogeneities of many kinds. The interactions may take the form of reflection or scattering. The inhomogeneities, also known as reflectors and scattering centers, represent discontinuities in the physical properties of the medium. Exemplary scattering centers may be found in one or more of i) an ensonified volume of the waterbody such as a water column, ii) upon the ensonified surface of the bottom, or within the ensonified volume of the sub-bottom.

Scattering centers of a biological nature may be present in the water column, as they are a part of the marine life. Scattering centers of a nonbiological nature may be present in the water column in the form of bubbles, dust and sand particles, thermal microstructure, and turbulence of natural or human origin, such as ships' wakes. Scattering centers on the surface of the bottom may be due to the mechanical roughness of the bottom, such as ripples, or be due to the inherent size, shape and physical arrangement of the bottom constituents, such as mud, sand, shell fragments, cobbles and boulders, or due to both the two factors. Scattering centers in the sub-bottom may be due to bioturbation of the sediments, layering of different sediment materials within the bottom or buried manmade structures such as pipelines.

Data processing within the echo sounder system may include contemporaneous processing of hydrophone data 106, for example to obtain bathymetric and/or backscatter data. Data processing may also include non-contemporaneous processing of multibeam echo sounder system data 108, for example to characterize bottom conditions or the water column.

Data processing may include utilization of complementary or other data. For example, contemporaneous processing of hydrophone data 106 may utilize contemporaneous 110 and/or non-contemporaneous 112 data such as contemporaneously collected geographic positioning system ("GPS") data, sound speed measurements, attitude, and navigational information. For example, non-contemporaneous processing of echo sounder system data may utilize contemporaneous 110 and/or non-contemporaneous 112 data such as non-contemporaneously collected waterbody bottom composition data and tidal records.

Figure 1B:
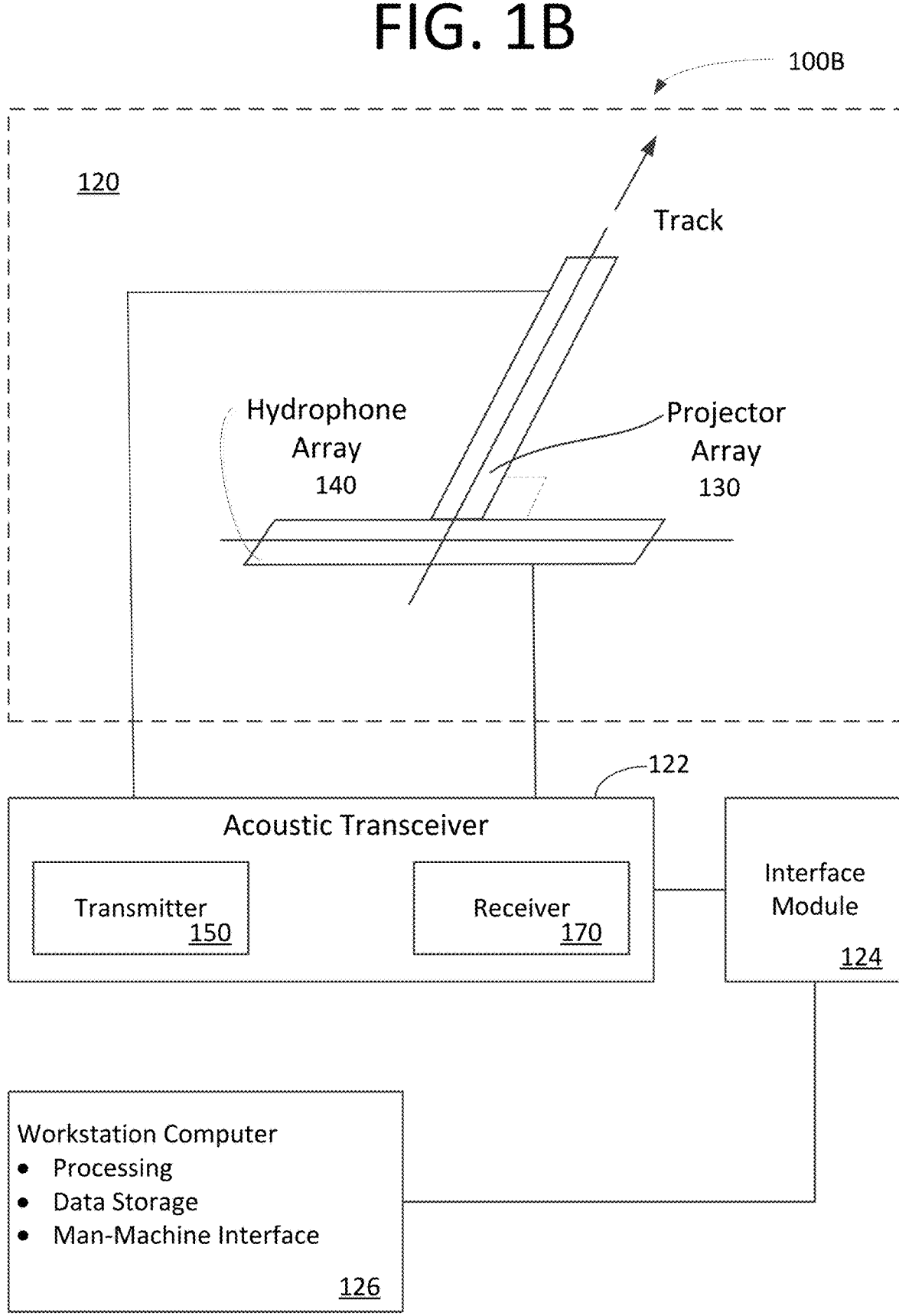

FIG. 1B shows portions of an exemplary multibeam echo sounder system ("MBES") 100B. The echo sounder system includes a transducer section 120 and an acoustic transceiver 122. The echo sounder system may include a transceiver interface such as an interface module 124 and/or a workstation computer 126 for one or more of data processing, data storage, and interfacing man and machine. Exemplary transducers, shown here in a Mills Cross arrangement 120, include a transmitter or projector array 130 and a receiver or hydrophone array 140. Projectors in the projector array may be spaced along a line that is parallel with a keel line or track of a vehicle or vessel to which they are mounted which may be referred to as an along track arrangement. In some embodiments, a receiver of the transceiver 122 has an operating frequency range matched with that of the projectors and/or the hydrophones.

During echo sounder operation, sound or pressure waves emanating from the projector array travel within a body of water and possibly within the bottom beneath the body of water and in doing so may undergo interactions, such as reflections or scattering, which disturb the propagation trajectory of the pressure waves. Some of the reflections or echoes are "heard" by the hydrophone array. See for example the disclosure of Etal, U.S. Pat. No. 3,144,631, which is included herein by reference, in its entirety and for all purposes.

The acoustic transceiver 122 includes a transmitter section 150 and a receiver section 170. The acoustic transceiver may be configured to transmit to a single projector array 130 and to receive from a single hydrophone array 140. In some embodiments, such a transceiver may be said to operate with a single transmitter array and a single receiver array. Unless otherwise noted, the term transceiver does not require common transmitter and receiver packaging.

In various embodiments, a single projector array ensonifies the entirety of a swath on a single ping. Here, a projector array may be a single projector array regardless of the geometry, arrangement, or quantity of devices employed. For example, where a plurality of projectors forms a plurality of spatially distinct projector groups, the plural projectors are a single projector array if they are operated to ensonify the entirety of a swath on a single ping.

In some embodiments, a single hydrophone array receives ensonified reflector returns from one or more fans or swaths on a single ping. Here, a hydrophone array may be a single hydrophone array regardless of the geometry, arrangement, or quantity of devices employed. For example, where a plurality of hydrophones forms a plurality of spatially distinct hydrophone groups, the plural hydrophones are a single hydrophone array if they are operated to receive ensonified reflector returns from a single ping.

In some embodiments, a multibeam echosounder can have a dual head configuration wherein two projector/hydrophone array pairs are used in cooperation to expand the total sector of coverage beneath the sensors beyond what any single array could ensonify by itself, potentially covering a sector 180° or more in width. Where projectors from two or more projector arrays are used to jointly ensonify a fan or fans on a single ping, they are considered a single projector array. Where hydrophones from two or more hydrophone arrays are used to jointly receive returns from a single ping, they are considered a single hydrophone array. In some embodiments, two hydrophone arrays, such as those arranged in a V-shape, may collectively receive echoes from a single projector array on a single ping, and if so, those hydrophones are considered a single hydrophone array.

The echo sounder may further include a means such as an interface module 124 for interconnection with the transceiver 122. This interface module may provide, among other things, a power supply for the transceiver, communications with the transceiver, communications with the workstation computer 126, and communications with other sources of data such as a source of contemporaneous GPS data.

The workstation computer 126 may provide for one or more of data processing such as data processing for visualization of survey results, for data storage such as storage of bathymetry data and backscatter data, for user inputs, and for display of any of inputs, system status, and survey results.

Figure 1C:
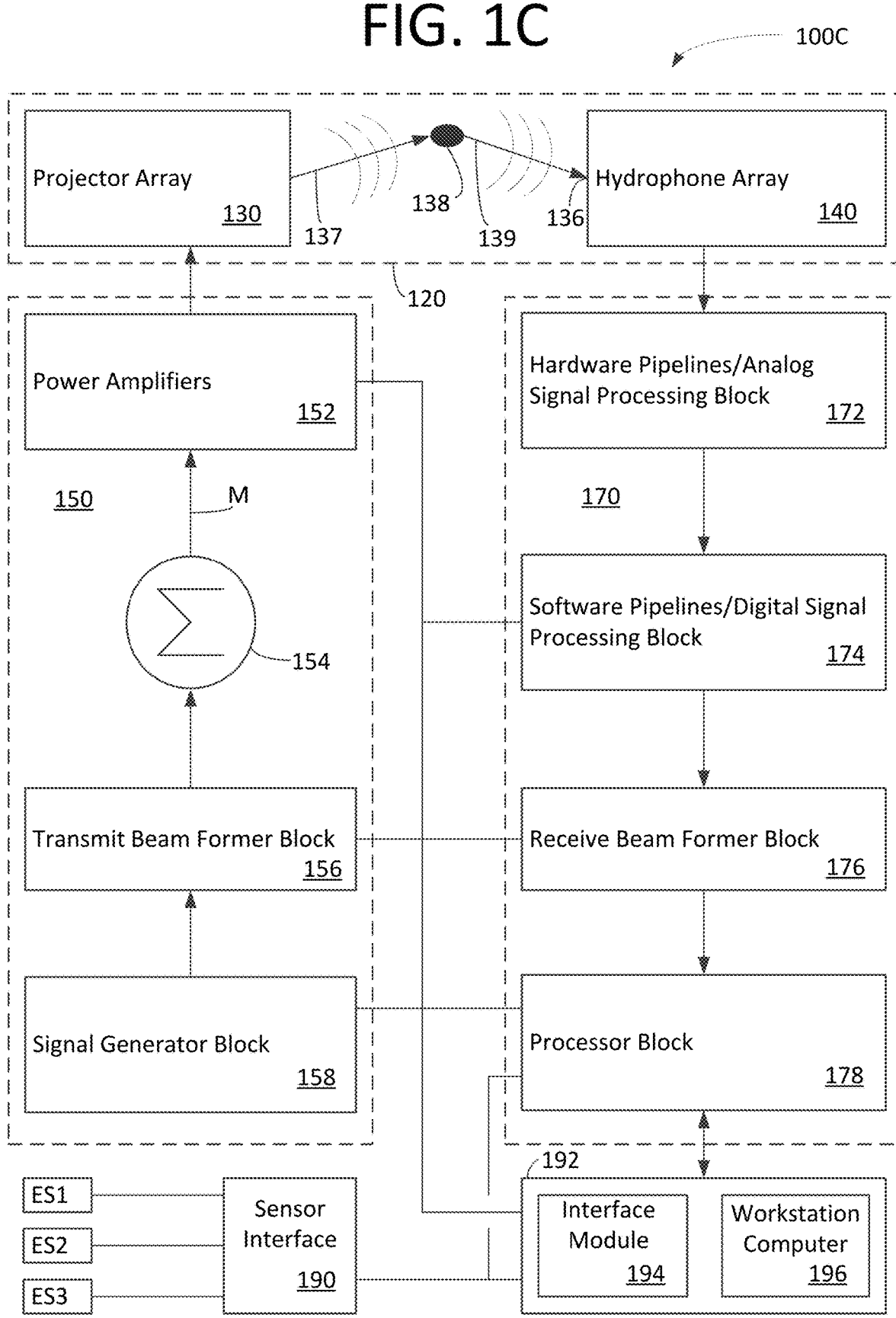

FIG. 1C shows portions of an exemplary multibeam echo sounder system ("MBES") 100C. The echo sounder system includes a transducer section 120, a transmitter section 150, and a receiver section 170. Some embodiments include a sensor interface section 190 and/or a management section 192.

The transducer section includes transducers for transmitting acoustic messages and transducers for receiving acoustic messages. For example, a transducer section may include an array of projectors 130 and an array of hydrophones 140.

Projectors in the projector array may include piezoelectric elements such as ceramic elements which may be stacked or not. Element geometries may include circular and non-circular geometries such as rectangular geometries. Some projectors have an operating frequency range of about 10 kHz to 100 kHz, of about 50 kHz to 550 kHz, or about 100 to 1000 kHz.

Hydrophones in the hydrophone array may include piezoelectric elements such as ceramic elements. Element geometries may include circular and non-circular geometries such as rectangular geometries. Some hydrophones have an operating frequency range of about 10 kHz to 100 kHz, of about 50 kHz to 550 kHz, or about 100 to 1000 kHz.

During operation of the projector array 130 and hydrophone array 140, the transmitter section excites the projector array, an outgoing message 137 emanates from the projector array, travels in a liquid medium to a reflector or scattering center 138, is reflected or scattered, after which a return or incoming message 139 travels to the hydrophone array 140 for processing by the receiver 170. Notably, the acoustic/pressure wave input 136 received at the hydrophone array 140 may include a perturbed version of the transmitted message 137 along with spurious signal and/or noise content.

The transmit section 150 may include a signal generator block 158, a transmit beamformer block 156, a summation block 154, and a power amplifier block 152. The transmit section provides for generation of or for otherwise obtaining one or more signals or message components 158 that will be used to compose a message 137. Notably, a message may be composed of multiple signals or not. Where a message is composed of multiple signals, the message may contain i) signals in parallel (superposed), ii) signals that are serialized (concatenated), or iii) may be a combination of parallel and serial signals.

The transmit beamformer block 156 receives the signal(s) from the signal generator block 158 where beamforming for each signal takes place. The beam(s) are combined in the summation block 154 to construct a parallel, serial, or combination message M. In the power amplifier block 152, the time series voltages of the message are amplified in order to excite or drive the transducers in the projector array 130. In an embodiment, each transducer is driven by a respective amplifier. Note that beamformers can be implemented using either time delays or, in the case of narrowband signals, phase shifts.

The receive section 170 includes multiple hydrophone signal processing pipelines. In an embodiment the receive section includes a hardware pipelines block/analog signal processing block 172, a software pipelines block/digital signal processing block 174, a receive beamformer block 176, and a processor block 178. The receive section provides for isolating and processing the message 137 from the input 136 received at the hydrophone array 140. For example, some embodiments process echoes to determine depths as a function of, among other things, round trip travel times that are based on matching a transmitted message 137 with a corresponding received message isolated from the hydrophone array input 136.

In the hardware pipeline block 172, plural hydrophone array transducers of the hydrophone array 140 provide inputs to plural hardware pipelines that perform signal conditioning and analog-to-digital conversion. In some embodiments, the analog-to-digital conversion is configured for oversampling where the converter $F_{in}$ (highest input frequency) is less than $F_s/2$ (one half of the converter sampling frequency). In an embodiment, a transceiver 122 operates with a maximum frequency of about 800 kHz. In an embodiment the transceiver utilizes analog-to-digital converters with sampling rates in a range of about 5 to 32 MHz. In an embodiment the transceiver utilizes analog-to-digital converters with sampling rates of about 5 MHz or about 32 MHz.

In the software pipeline block 174, the hardware pipelines 172 provide inputs to the software pipelines. One or more pipelines serve each of the hydrophones in the hydrophone array. Each software pipeline provides downconversion and filtering. In various embodiments, the filter provides for recovery of a message from a hydrophone input 136. In an embodiment, each hydrophone is served by plural pipelines for interpreting, distinguishing, deconstructing, and/or decoding a message such as a multicomponent message.

In the receive beamforming or steering block 176, the software pipelines 174 provide beamformer inputs. Beamformer functionality includes phase shifting and/or time delay and summation for multiple input signals. In an embodiment, a beamformer is provided for each of multiple coded signals. For example, where software pipelines operate using two coded signals, inputs to a first beamformer are software pipelines decoding a first code and inputs to a second beamformer are software pipelines decoding a second code.

In the processor block 178, the beamformers of the beamformer block 176 provide processor inputs. Processor functionality may include any one or more of bottom detection, backscatter processing, data reduction, Doppler processing, acoustic imaging, and generation of a short time series of backscatter sometimes referred to as "snippets."

In an embodiment, a management section 192 and a sensor interface section 190 are provided. The management section includes an interface module 194 and/or a workstation computer 196. The sensor interface section provides for interfacing signals from one or more sensors ES1, ES2, ES3 such as sensors for time (e.g. GPS), motion, attitude, and sound speed.

In various embodiments, control and/or control related signals are exchanged between the management section 192 and one or more of the power amplifier block 152, software pipelines block 174, transmit beamformer block 156, receive beamformer block 176, signal generator block 158, processor block 178. And, in various embodiments sensor interface section data 190 are exchanged with the management section 192 and the processor block 178.

FIG. 1D shows portions of an exemplary multibeam echo sounder system ("MBES") 100D. The echo sounder system includes a transducer section 120, a transmitter section 150, and a receiver section 170. Some embodiments include an interface section 190 and/or a management section 192.

In the embodiment shown, a message 153 incorporating quantity N signals, for example N different coded signals, is used to excite plural projectors in a projector array and a receiver having quantity T hardware or software pipelines and (T×N) hardware or software pipelines may be used to process T hydrophone signals for recovery of echo information specific to each of the N coded signals.

The transmitter section 150 is for exciting the projector array 130. The section includes a signal generator block 158, a transmit beamformer block 156, a summation block 154, and a power amplifier block 152.

The signal generator block 158 may generate quantity N signals or message components, for example N different coded signals (e.g., $S_{cd1} \ldots S_{cdN}$). In various embodiments, each of plural signals within a message may share a common center frequency and/or a common frequency band. In various embodiments, each of the plural signals within a message may be in distinct frequency bands that do not overlap the frequency bands of other signals.

A transmit beamformer block 156 receives N signal generator block outputs. For each of the N signals generated, the beamformer block produces a group of output beam signals such that there N groups of output beam signals.

The summation block 154 receives and sums the signals in the N groups of output beams to provide a summed output 153.

The power amplifier block 152 includes quantity S amplifiers for driving respective projectors in the projector array 130. Each power amplifier receives the summed output or a signal that is a function of the summed output 153, amplifies the signal, and drives a respective projector with the amplified signal.

An array of quantity T hydrophones 140 is for receiving echoes of acoustic/pressure waves originating from the projector array 130. The resulting hydrophone signals are processed in the receiver section 170 which includes a hardware pipeline block 172, a software pipeline block 174, a receive beamformer block 176, and a processor block 178.

In the hardware pipeline block 172, T pipelines provide independent signal conditioning and analog-to-digital conversion for each of the T hydrophone signals.

In the software pipeline block 174, (T×N) software pipelines provide downconversion and filtering for each of the T hardware pipeline outputs. Means known in the art, for example, bandpass filters and matched filters, may be used to distinguish differently coded signals. As shown, each of T hardware pipeline outputs 181, 182, 183 provides N software pipeline inputs a,b and c,d and e,f (i.e., 3×2=6 where T=3 and N=2).

In the receive beamformer block 176, (T×N) software pipeline block 174 outputs are used to form N groups of beams. A beamformer is provided for each of N codes. For example, where there are T=3 hydrophones and software pipelines process N=2 codes, inputs to a first beamformer are software pipelines processing the first code $a_1$, $c_1$, $e_1$ and inputs to a second beamformer are software pipelines processing the second code $b_1$, $d_1$, $f_1$.

In the processor block 178, N processors receive respective groups of beams formed by the beamformer block 176. Processor block 178 data are exchanged with a management section 192 and sensor interface 190 data ES1, ES2, ES3 are provided to the management section and/or the processor block.

In various embodiments control signals from the management block 192 are used to make power amplifier block 152 settings (e.g., for "S" power amplifiers for shading), to control transmit 156 and receive 176 beamformers, to select software pipeline block 174 operating frequencies, and to set signal generator block 158 operating frequencies.

As the above illustrates, the disclosed echo sounder transmitter may construct a message incorporating N components such as N coded signals. And, the echo sounder may utilize a receiver having T hardware pipelines and (T×N) software pipelines to process T hydrophone signals for recovery of echo information specific to each of the N message components.

Figure 1E:
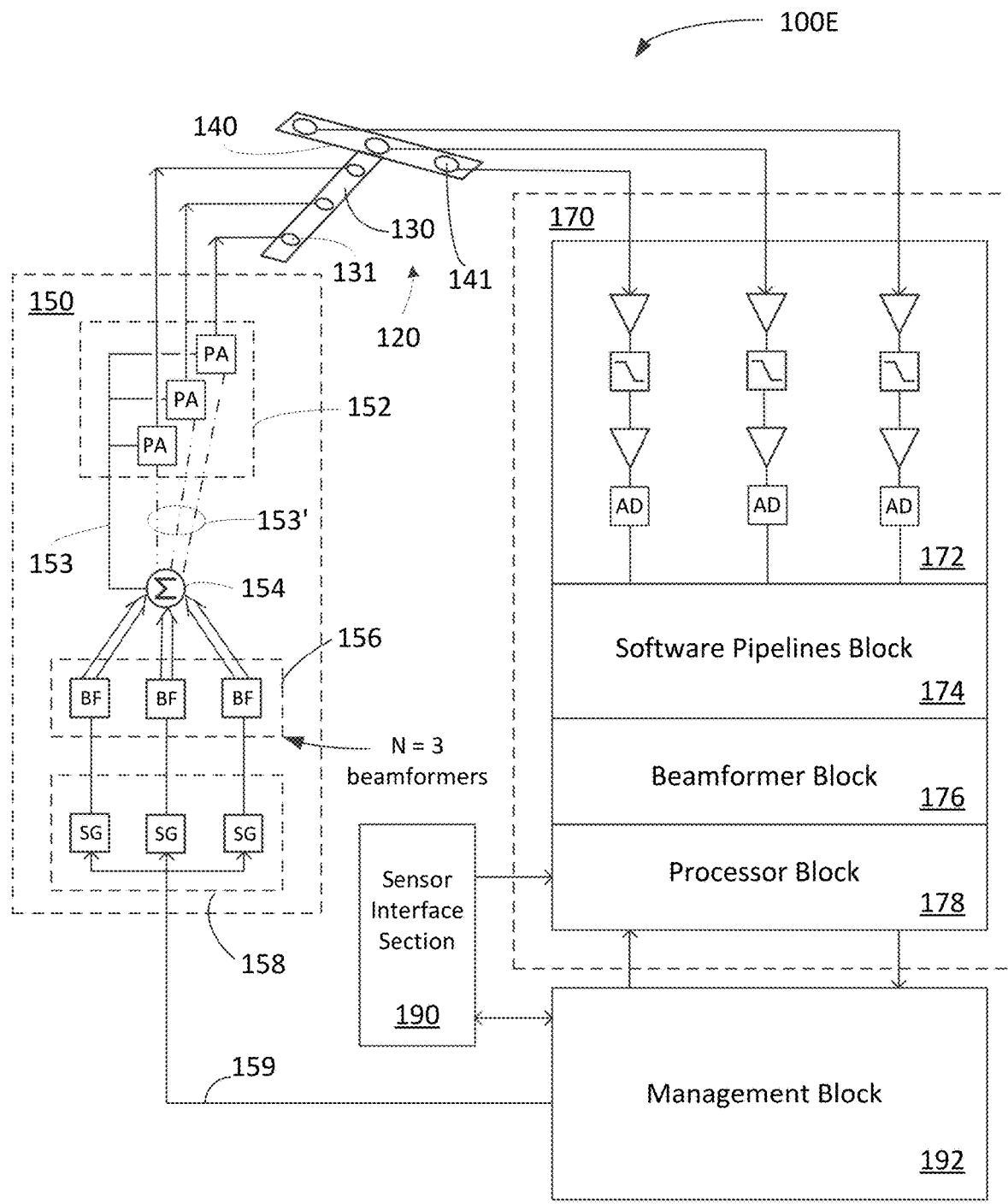
Figure 1F:
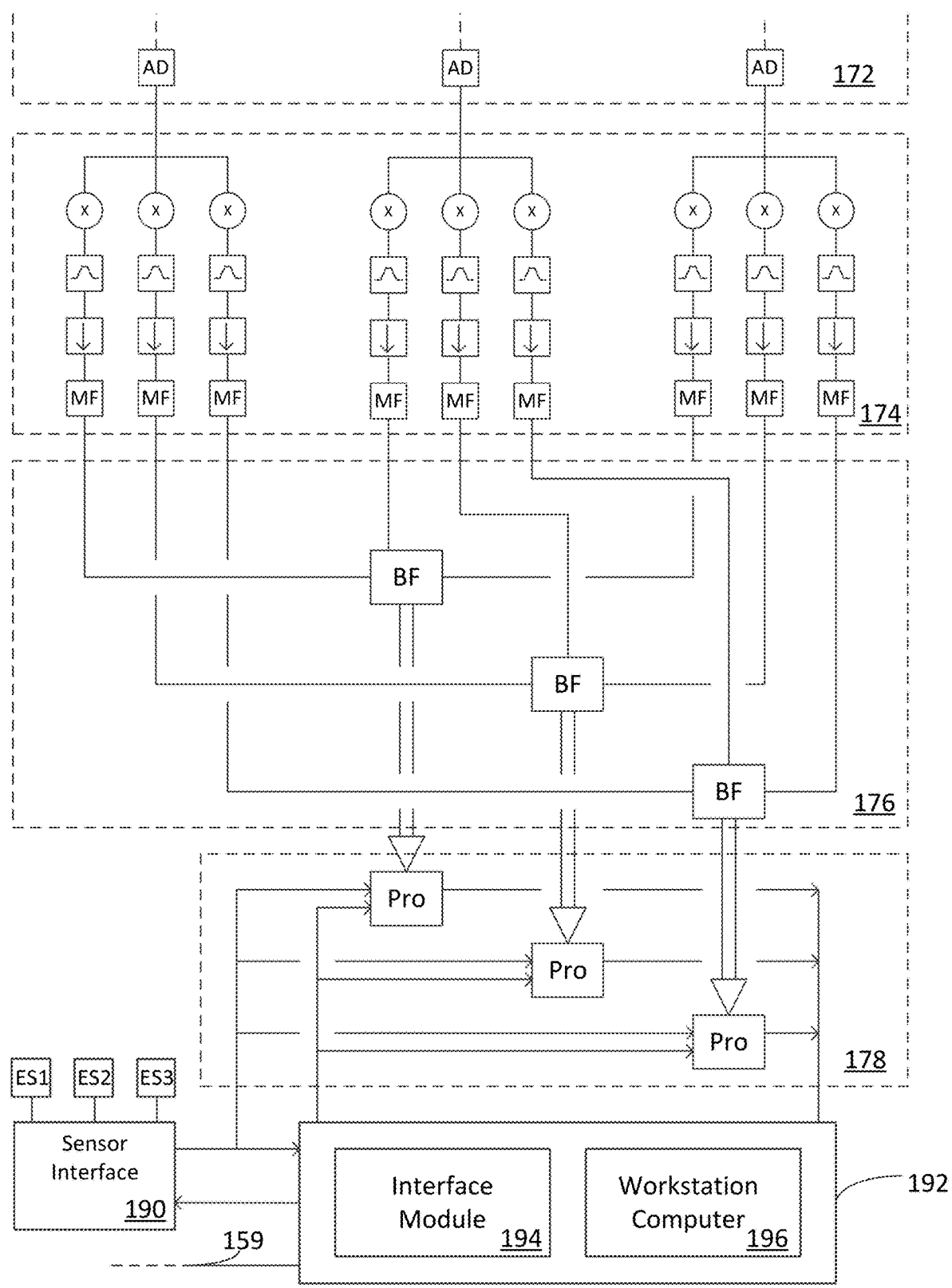

FIGS. 1E-F show portions of an exemplary multibeam echo sounder system ("MBES") 100E-F. The echo sounder system includes a transducer section 120, a transmitter section 150, and a receiver section 170. Some embodiments include an interface section 190 and/or a management section 192.

In the embodiment shown, a message 153 incorporating first, second, and third message components such as coded signals $S_{cd1}$, $S_{cd2}$, $S_{cd3}$ where N=3 is used to excite three projectors in a projector array, and a receiver having three hardware pipelines and nine software pipelines is used to process three hydrophone signals T=3 to recover echo information specific to each of the N message components.

The transmitter section 150 is for exciting the projector array 130. The section includes a signal generator block 158, a transmit beamformer block 156, a summation block 154, and a power amplifier block 152.

In the signal generator block 158, signals are constructed, generated, recalled and/or otherwise provided. Here, an exemplary process is depicted with e.g., N=3 signal generators. In each beamformer of the beamformer block 156, a transmit beam is formed. In a summation block 154, beamformer output signals are combined to produce summation block output signals.

In some embodiments, the summation block output is a) to a single line 153 which may be a bus coupled with the S projectors, for example via amplifiers 152, or b) to multiple signal lines 153' respectively coupled with S projectors, for example via amplifiers 152. Here, there are S outputs from each of N beamformers 156, the S outputs directed to S projectors. In the summer, all of the beamformer outputs for a given projector are summed. Summed signals are directed to respective projectors.

For example, given N=3 beamformers (beamformer 1, beamformer 2, beamformer 3) and S=3 projectors (projector 1, projector 2, projector 3), beamformer outputs are summed and directed to the projectors. In particular, outputs of beamformer 1 (m1, n1, o1), beamformer 2 (m2, n2, o2), and beamformer 3 (m3, n3, o3) are summed to produce summer outputs (m1+m2+m3) directed to projector 1, (n1+n2+n3) directed to projector 2, and (o1+o2+o3) directed to projector 3.

The transducer block 120 includes a projector array 130 and a hydrophone array 140 arranged, for example, as a Mills Cross. As shown, there are three projectors 131 in the projector array and three hydrophones 141 in the hydrophone array. In the power amplifier block 152, the summed signal or transmit message 153 is an input to power amplifiers driving respective projectors.

Applicant notes that for convenience of illustration, the projector and hydrophone counts are limited to three. As skilled artisans will appreciate, transducer arrays do not require equal numbers of projectors and hydrophones nor do the quantities of either of these types of transducers need to be limited to three. For example, a modern multibeam echo sounder might utilize 1 to 96 or more projectors and 64 to 256 or more hydrophones.

The array of T=3 hydrophones 141 is for receiving echoes resulting from the acoustic/pressure waves originating from the projector array 130. The resulting hydrophone signals are processed in the receiver section 170 which includes a hardware pipeline block 172, a software pipeline block 174, a receive beamformer block 176, and a processor block 178.

In the hardware pipelines block 172, each of T=3 hardware pipelines processes a respective hydrophone 141 signal through analog components including an analog-to-digital converter. In the embodiment shown, a hardware pipeline provides sequential signal processing through a first amplifier, an anti-aliasing filter such as a low pass anti-aliasing filter, a second amplifier, and an analog-to-digital converter.

In the software pipelines block 174, each of the T=3 hardware pipeline outputs is processed through N=3 software pipelines with downconversion and filtering. Note that each software pipeline may include N processing strings. The split of T signals to T×N signals may occur in block 172, in block 174, or between these two blocks. Note that in FIG. 1D, the split of signals occurs between blocks 172 and 174. Note that in FIG. 1F, the split of signals occurs within block 174.

In FIG. 1F, a software pipeline provides sequential signal processing through a mixer (an oscillator such as local oscillator may be coupled to the mixer), a bandpass filter, a decimator, and a matched filter. One or both of the bandpass filter(s) and the matched filter(s) may be used. For example, this choice may depend on the type of survey mission (bathymetry . . . etc.) being performed and/or on the method of performing the mission. Communications may occur via communications links between any of the processor block 178, the signal generator block 158, the hardware pipelines block 172, the software pipelines block 174, the and the beamformer block 176. See for example FIGS. 1C-D.

Each software pipeline may have a single mixer and/or each hardware pipeline may have no mixer. A processor 178 may control gain of a first and/or a second hardware pipeline amplifier. A processor may provide for tuning, for example via a processor controlled oscillator coupled with a mixer.

In the receive beamformer block 176, each of N=3 beamformers processes signals. As such, i) a first set of three software pipeline outputs corresponding to a first coded signal are processed by a first beamformer, ii) a second set of three software pipeline outputs corresponding to a second coded signal are processed by a second beamformer, and (iii) a third set of three software pipeline outputs corresponding to a third coded signal are processed by a third beamformer. Notably, beamformers may be implemented in hardware or software. For example, one or more beamformers may be implemented in one or more field programmable gate arrays ("FPGA").

In the processor block 178, each of N=3 processors are for processing respective beamformer outputs. Here, a first plurality of beams generated by the first beamformer is processed in a first processor, a second plurality of beams generated by the second beamformer is processed in a second beamformer, and a third plurality of beams generated by the third beamformer is processed in a third beamformer.

Processor outputs interconnect with a management section 192. Notably, one or more processors may be implemented in a single device such as a single processor or digital signal processor ("DSP") or in multiple devices such as multiple signal processors or digital signal processors.

Complementary data may be provided via, inter alia, a sensor interface section 190 that is interfaced with a plurality of sensors ES1, ES2, ES3. The sensor interface module may provide sensor data to the management section 192 and/or to processors in the processor block 178.

The management section 192 includes a sonar interface 194 and/or a workstation computer 196. In various embodiments control signals from the management block 192 are used for one or more of making power amplifier block 152 settings (e.g., for array shading), controlling transmit 156 and receive 176 beamformers, selecting software pipeline block 174 operating frequencies, setting set signal generator block 158 operating frequencies, and providing processor block 178 operating instructions.

Applicant notes that the echo sounder systems of FIGS. 1C-F may be used to process hydrophone returns from targets i) present within an ensonified volume of the water body, ii) upon an ensonified surface of the bottom, or iii) lying within an ensonified volume of the bottom.

Figure 2A:
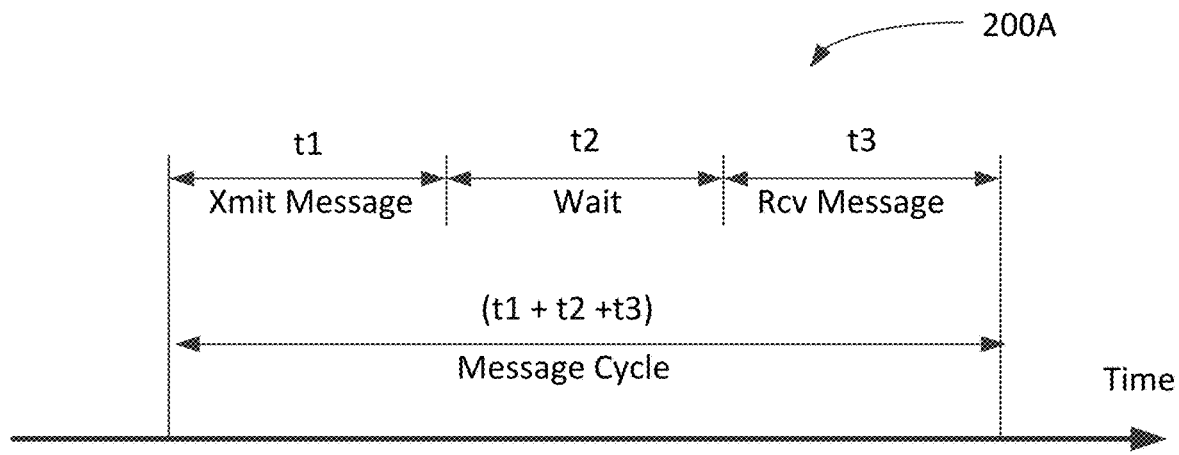
FIGS. 2A-B show message cycles for use with the multibeam echo sounder system of FIG. 1A.

FIG. 2A shows a first message cycle 200A. The cycle includes a sequence of operations with transmission of a message during a time t1 and reception of a message during a time t3. Transmission of a message refers to a process that excites the projector array 130 and reception of a message refers to a complementary process including message echo receipt by the hydrophone array 140. A wait time t2 that varies primarily with range, angle, and sound speed may be interposed between the end of the message transmission and the beginning of the message reception. This wait time may be determined by the sonar range scale setting or round trip travel time for the longest sounding range, for example a return from the most distant observed location or cell in a swath ensonified by the projector array. In some embodiments, the message transmit length is in a range of 10 to 60 microseconds. In some embodiments, the transmit message length is about 5-15 milliseconds or 10 milliseconds.

Figure 2B:
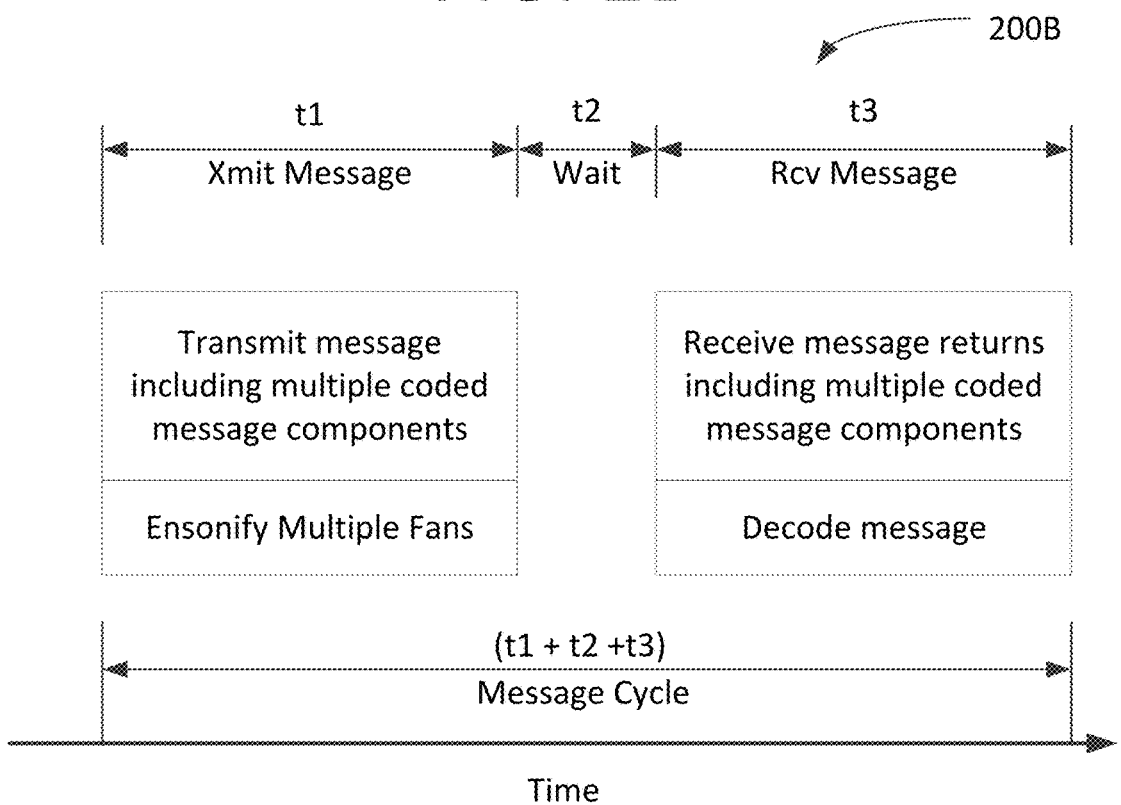

FIG. 2B shows a second message cycle 200B. Here, a transmitted message includes multiple coded message components. During transmission of the message, each of the message components is steered as by beamformers 156 to ensonify a respective zone of reflectors or fan of a waterbody bottom as is further explained below. Each of the transmitted message components results in a similarly coded message component return. Decoding in the receiver separates these returns such that data specific to each fan is available for analyses.

Figure 3B:
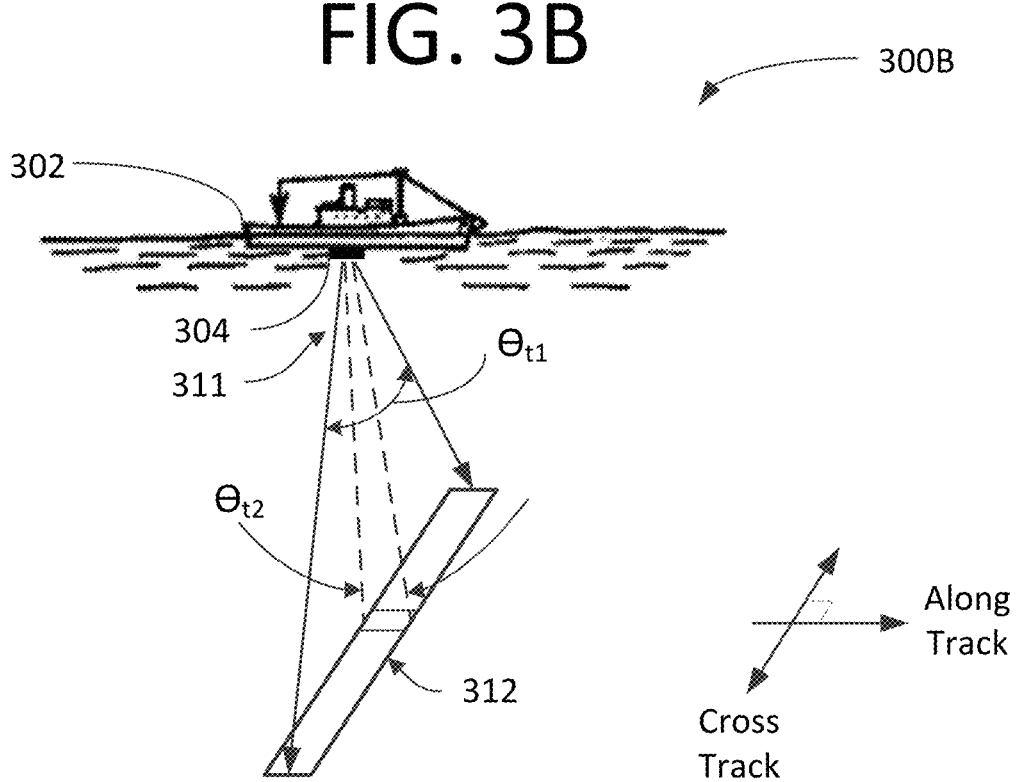

FIGS. 3A-D shows an exemplary vessel equipped with a multibeam echo sounder 300A-D. See for example the echo sounders of FIGS. 1A-E. As seen in FIG. 3A, an MBES array package 304 is affixed to a vessel 302, for example to a bottom of the vessel.

Within the array package 304 is an along track array of projectors 308 and a cross track array of hydrophones 310. The projector array is for excitation by a transmit message such as the message of FIG. 2A or FIG. 2B. The hydrophone array is for receiving echoes of the transmitted message.

Applicant notes that for convenience of illustration, all arrays are pictured herein as linear arrays of projectors or hydrophones. This is because a linear receiver array mounted perpendicular and adjacent to a projector array, forming the capital letter "T" in the modern English alphabet, is a cost-effective means of implementing the Mills Cross technique, explained below, in a sonar design. It is cost-effective because, with two line arrays of L elements each, it can provide the high spatial resolution in two dimensions that would otherwise require a fully populated L×L array to achieve the desired spatial resolution.

The Mills Cross technique employs two asymmetric and intersecting beampatterns to achieve a composite beam corresponding to the intersection of the two beams. The technique originated in the field of radio astronomy where both beampatterns were associated with a line of receivers. The Mills Cross technique was modified when it migrated into the field of sonar. Here, one beampattern became typically that of a line array transmitter and the other beampattern became typically that of a line array receiver. The transmit and receive arrays in an active sonar utilizing the Mills Cross technique are collectively referred to as a Mills Cross array. A zone or area of the waterbody bottom or water column that is both ensonified by the transmit portion of a Mills Cross array and observed by a receiver portion of the same Mills Cross array is at a particular location where the two beampatterns spatially overlap. Thus, Mills Cross functionality is a kind of spatial filtering.

As mentioned, Mills Cross' perpendicular projector and hydrophone arrays have one transmit aperture substantially orthogonal to at least one receive aperture. This is a natural and widely used array geometry. However, other array geometries with intersecting beams may operate in a similar manner. For example, a variation of the Mills Cross array geometry may use non-perpendicular arrays and non-orthogonal transmit and receive beams. However, the beams may still intersect to provide a composite narrow beam cross-product. For example, in some embodiments, Mills Cross arrays mounted on the hull of a boat may have curvature resembling a bow. In other embodiments, array elements may be arranged in a semicircular, hemispherical or cylindrical pattern. What is important here is the presence of two distinct arrays whose transmit and receive beams intersect at a particular waterbody location, and where the dimension of that area is defined in the along-track direction by one array and the dimension of that area in the cross-track direction is defined by the other array.

FIG. 3B shows bottom ensonification 300B. In particular, an across track fan of a waterbody bottom 312 is ensonified by the projector array 308. Note the along track projector array 308 ensonifies an across track fan. As shown, the projected beam 311 has a wide across track aperture angle $\theta_{t1}$ as compared with a relatively narrow along track aperture angle $\theta_{t2}$. Echoes from this ensonified fan may be received by the hydrophone array 310.

Figure 3C:
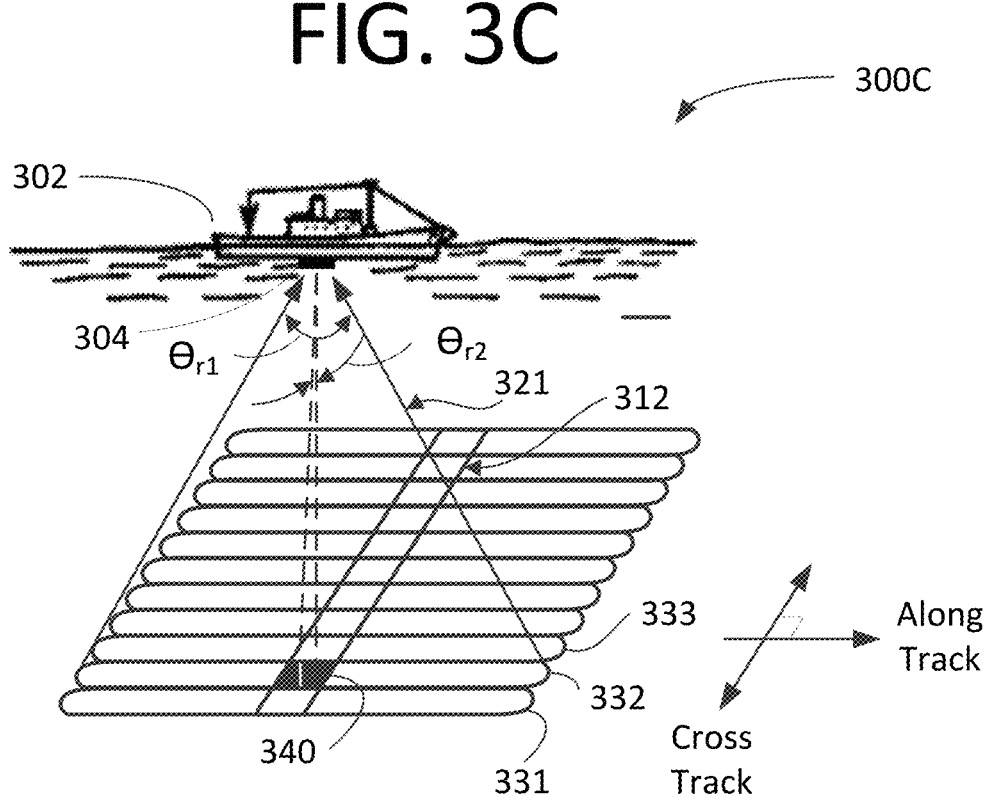

FIG. 3C shows bottom ensonification and echoes that result from the bottom 300C. In particular, echoes from the ensonified across track fan 312 are received by the hydrophone array 310. As shown, the received beam 321 has a wide along track aperture angle $\theta_{r1}$ as compared with a relatively narrow across track angle $\theta_{r2}$. And, as shown, the hydrophone array beam may be steered to observe or read a set of along track strips 331, 332, 333 . . . that intersect the ensonified fan 312 at multiple adjacent or overlapping locations. Data such as bathymetric data may be obtained from and associated with each of these intersecting locations or areas 340 such that each time an across track fan is ensonified, multiple receiving beams observe multiple receiving strips and provide bathymetric data at multiple locations along the ensonified fan.

Just as a single ensonified fan 312 may be observed or read by multiple receiving beams 321, so too may multiple ensonified fans be observed or read by multiple receiving beams.

FIG. 3D shows multifan bottom ensonification 300D. Here, the projector array is steered to produce multiple adjacent or overlapping fans that are oriented across track. While any number of fans, such as 2, 3, 4, 5, 10 or more fans, may be ensonified, the example of FIG. 3D shows five fans comprising a center fan flanked by Forward A and Aft A fans which are flanked by Forward B and Aft B fans respectively. As before, multiple receiving beams 351 provide a set of along track receiving strips 361, 362, 363. These receiving strips intersect the multiple fans 372.

When a receiving strip 362 intersects multiple fans, a plurality 372 of cells 340 may be observed. And, when multiple receiving strips 361, 362, 363 . . . intersect multiple fans, a grid-like or two-dimensional zone 370 results and bathymetric data may be obtained from each of the cells identified by intersections within the zone.

Applicant notes that as shown in FIG. 3D each of the fans has opposed cross-track boundaries that are essentially straight lines. This presentation is idealized. In practice, these opposed fan boundaries may be curved. For example, fan outlines on a waterbody bottom may be parabolic in shape with a cross-track major dimension. Transmit beamforming and/or other than planar waterbody bottoms may contribute to fans having other than straight cross-track boundaries but that does not preclude locating the centers of the cells 340.

Advantages of multifan operation may include increased survey speed resulting from, for example, an extended along track zone of ensonification, redundancy via overlapping of zones (e.g., where a fifty percent overlap between pings may provide two looks at every waterbody bottom location observed), and imaging a given target from multiple aspects. For example, imaging from multiple aspects including at nadir and from two opposing off-nadir sides. For example, imaging from multiple aspects including front, overhead, and behind.

In various embodiments, realizing the benefits of a multifan survey system requires an MBES capable of distinguishing between echoes returned from each of the fans. While time separation of components within a message might be used, this requires that signals ensonifying each of the fans be separated in time. The content of a message may be transmitted in a single or in multiple message cycles. While frequency separation might be used, this requires that the receiver's bandwidth be divided. A solution when echo signals include returns from multiple fans that overlap in time and frequency and that does not require division of receiver bandwidth involves spread spectrum coded signals. In particular, transmitter messages that incorporate multiple parallel, serial, or parallel-serial coded message components can enable separation of message components. Further, where a message incorporates multiple serial components, the entire transmitter source level may be sequentially dedicated to each component such that higher energy signals result.

FIG. 3E shows a transmitted message ensonifying five fans 300E. Here, an MBES projector array 308 transmits 380 five formed beams 381-385 to a center fan, to Aft A and Forward A fans flanking the center fan, and to peripheral Aft B and Forward B fans. Each of the five formed beams 381-385 ensonifies a respective fan with one of five differing coded signals or message components within the message such that the receiver can associate message return components with their respective fans.

In the example shown, Aft B fan is ensonified with coded signal 1 by the first beam 381, the Aft A fan is ensonified with coded signal 2 by the second beam 382, the Center fan is ensonified with coded signal 3 by the third beam 383, the Forward A fan is ensonified with coded signal 4 by the fourth beam 384, and the Forward B fan is ensonified with coded signal 5 by the fifth beam 385. Notably, as described here, a single message may include all of the message components for ensonifying the multiple fans. Further, these message components may be arranged within a single message cycle i) serially such that the fans are ensonified in some sequential order, ii) in parallel such that the fans are simultaneously ensonified, or iii) in a serial-parallel message construct. In another example, these message components may be divided among multiple message cycles.

Figure 3F:
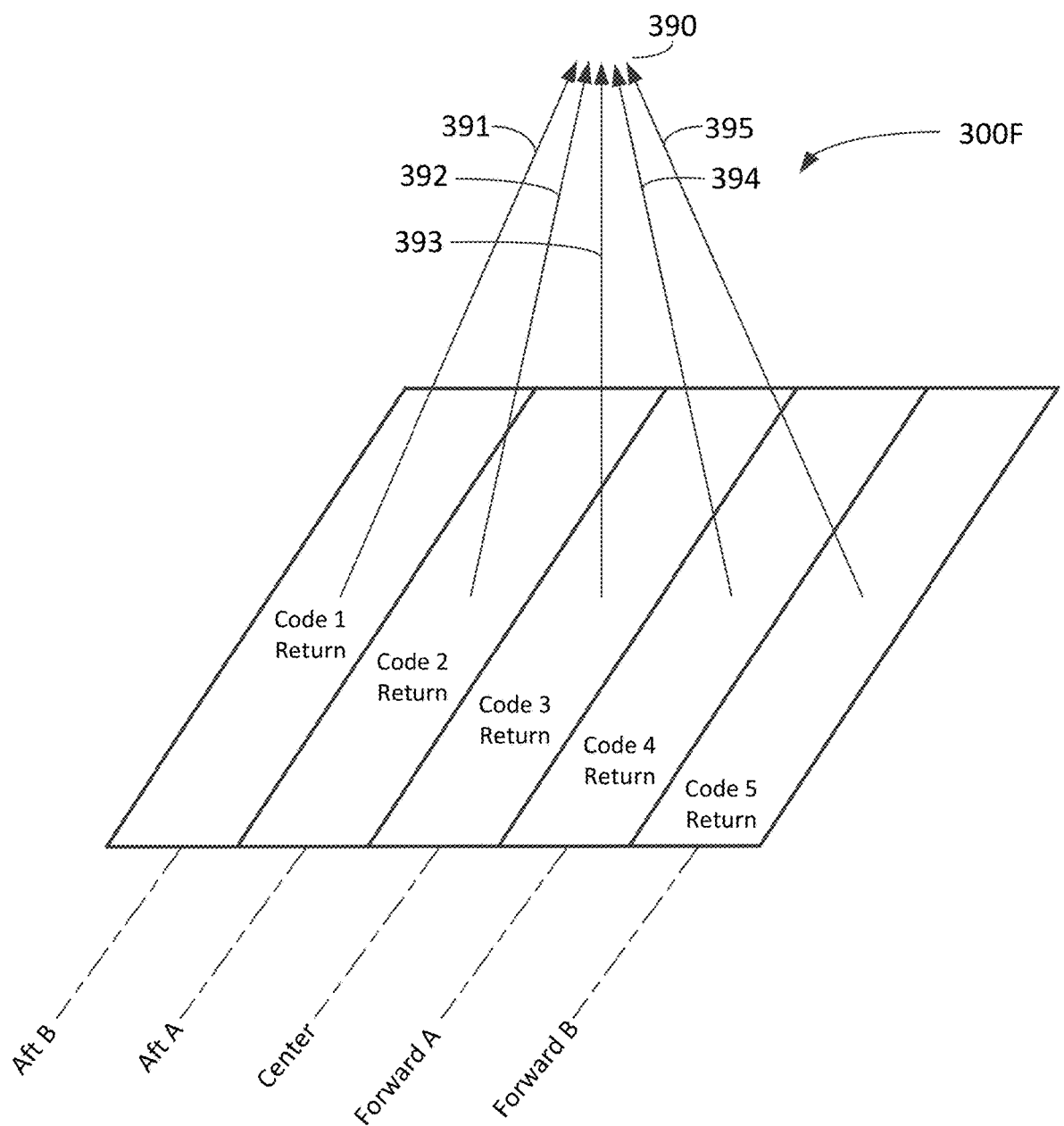

FIG. 3F shows returns 300F from the message of FIG. 3E. Here, an MBES hydrophone array 310 receives 390 five formed beams 391-395 from the center fan, from Aft A and Forward A fans flanking the center fan, and from peripheral Aft B and Forward B fans. Each of the five formed beams 391-395 provides returns from a respective fan with one of five differing message components included in the transmitted message such that the receiver can separate the returns.

FIG. 4 shows a table of coded signals and sequences ("codes") 400. Listed here are spread spectrum, noise-like, directionally coded (sweeps), and frequency-separable codes that may be used to construct differing signals or message components for inclusion in a transmitted message. Differing waveforms and/or combinations of waveforms in the returns from such a message enable a receiver to discriminate among the message components, for example by matched filtering.

Signal spreading codes may be used to create spread spectrum signals. As seen in the table, signal spreading may be accomplished by frequency hopping. Frequency hopping uses a pseudorandom carrier shift of a frequency shift keyed (FSK) signal. Applicable coding includes Costas and Reed Solomon guided methods of frequency selection.

Signal spreading may also be accomplished by direct sequencing. With direct sequencing, there is a pseudorandom phase shift of a phase shift keyed (PSK) signal. Direct sequencing spread spectrum (DSSS) may utilize codes including Barker, Gold, Maximum-Length, Kasami, and Walsh guided methods of phase selection.

Another coding scheme provides for constructing signals that have a low predictability, for example noise-like coded signals. As shown in the table, noise-like waveform construction may be guided by pseudorandom inputs such as Gaussian noise and deterministic chaos. In various embodiments, either of signal frequency or phase may be manipulated by these pseudorandom inputs to construct differing waveforms for inclusion in a message such that returns are separable or uniquely separable by a receiver.

Yet another coding scheme includes the family of frequency modulated (FM) sweeps such as linear FM, hyperbolic FM, stepped chirp, and the like, where the direction of frequency shift, increasing or decreasing, is a signal characteristic that enables the separation of returns by a receiver. For example, for a given pair of FM signals, one may sweep up in frequency while the other sweeps down in frequency, yet both can occupy the same frequency band and still be separable when sweep rate and/or direction are different.

Lastly, the use of CW signals (continuous waveforms such as sine waves) can also act as a coding scheme when the signals occupy distinct frequency bands and frequency separation is used to distinguish among signals.

FIGS. 5A-G show exemplary use 500A-G of one of the spread spectrum codes of FIG. 4. In particular, the figures illustrate use of Costas codes for guiding construction of differing waveforms wherein each waveform represents a given Costas code and message component in a transmitted message. As seen in FIG. 4 above, this use of Costas codes is a spread spectrum, frequency hopping technique.

Figure 5A:
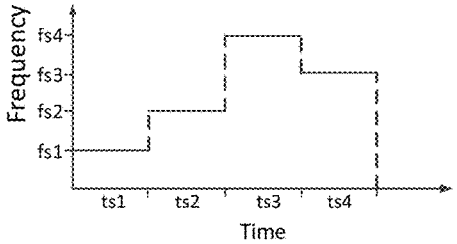
FIGS. 5A-G show various spread spectrum messages for use with the multibeam echo sounder system of FIG. 1A.
Figure 5A:
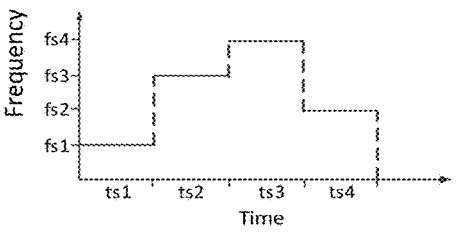
Figure 5A:
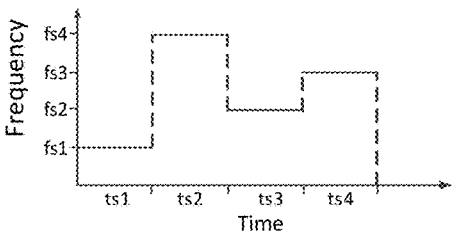
Figure 5A:
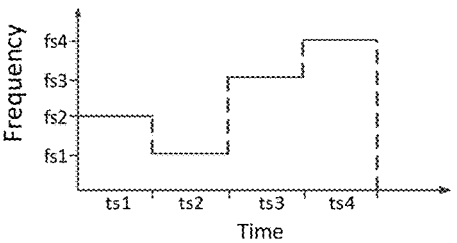
Figure 5A:
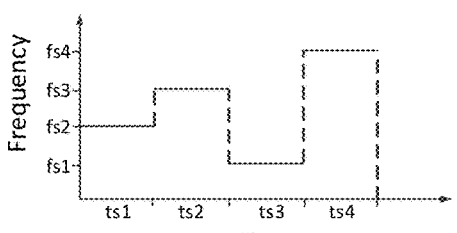

The table of FIG. 5A shows that five fans are ensonified using respective Costas coded signals 500A. In particular, five fans (e.g, 380 of FIG. 3E) are ensonified by five respective Costas coded signals.

Fan 1 in location Aft B is ensonified by an orthogonal spread spectrum signal ("OSS") designated OSS1. Based on a Costas array of order N=4, the signal's Costas code {1,2,4,3} is one of twelve valid Costas codes for this array order. Fan 2 in location Aft A is ensonified by an OSS signal designated OSS2 with Costas code {1,3,4,2}. Fan 3 in location Center is ensonified by an OSS signal designated OSS3 with Costas code {1,4,2,3}. Fan 4 in location Forward A is ensonified by an OSS signal designated OSS4 with Costas code {2,1,3,4}. Fan 5 in location Forward B is ensonified by an OSS signal designated OSS5 with Costas code {2,3,1,4}.

The rightmost column of the table shows spectrograms of message components for ensonifying respective fans. As seen, fan 1 is ensonified by a message component with coding guided by Costas code {1,2,4,3}. The spectrogram shows four time intervals ts1, ts2, ts3, ts4 and respective frequencies fs1, fs2, fs4, fs3. The waveforms associated with this spectrogram may be four sine waves having frequencies fs4>fs3>fs2>fs1 such that, for example, a plurality of cycles at a particular frequency establishes a spectrogram frequency.

In similar fashion, fan 2 is ensonified by a message component with coding guided by Costas code {1,3,4,2}, fan 3 is ensonified by a message component with coding guided by Costas code {1,4,2,3}, fan 4 is ensonified by a message component with coding guided by Costas code {2,1,3,4} and fan 5 is ensonified by a message component with coding guided by Costas code {2,3,1,4}.

Because transmitted message components are coded, the message returns may be separated or uniquely separated into individual returns from each of the fans. In some embodiments, this facility is provided when a receiver includes for each message component a filter such as a matched filter (see e.g. MF of FIG. 1F) that is designed to detect only that message component. In an embodiment, a receiver includes N matched filters and each filter selectively detects a respective fan return.

FIGS. 5B-G show exemplary parallel, serial, and parallel-serial messages 500B-G for ensonifying a plurality of fans (see e.g., FIG. 3E). As seen, these messages may occupy a portion of, substantially all of, or all of a receiver's available bandwidth.

Regarding a choice of parallel and serial transmission of message components, altitude may determine the more desirable transmission format where altitude is a depth measured between a projector array and a waterbody bottom directly below the projector array. In particular, as altitude decreases, a message transmit time window is reduced when a transmission must end before a first echo is returned. Such a shortened transmit time window may create a preference for parallel rather than serial transmission of message components. As altitude decreases, there is also a tendency toward transmitter signal excess which further supports the use of parallel transmissions that share total source level.

In similar fashion, as altitude increases, a transmit time window is increased and transmission of serial message components may be desirable. Here there is a tendency away from transmitter signal excess which suggests the desirability of serial message components that do not share total source level. In another consideration, if transmitting all message components in a single message cycle is disadvantageous due to limitations imposed by altitude, source level, or other, message components may be transmitted in serial or parallel-serial over multiple message cycles.

Figure 5B:
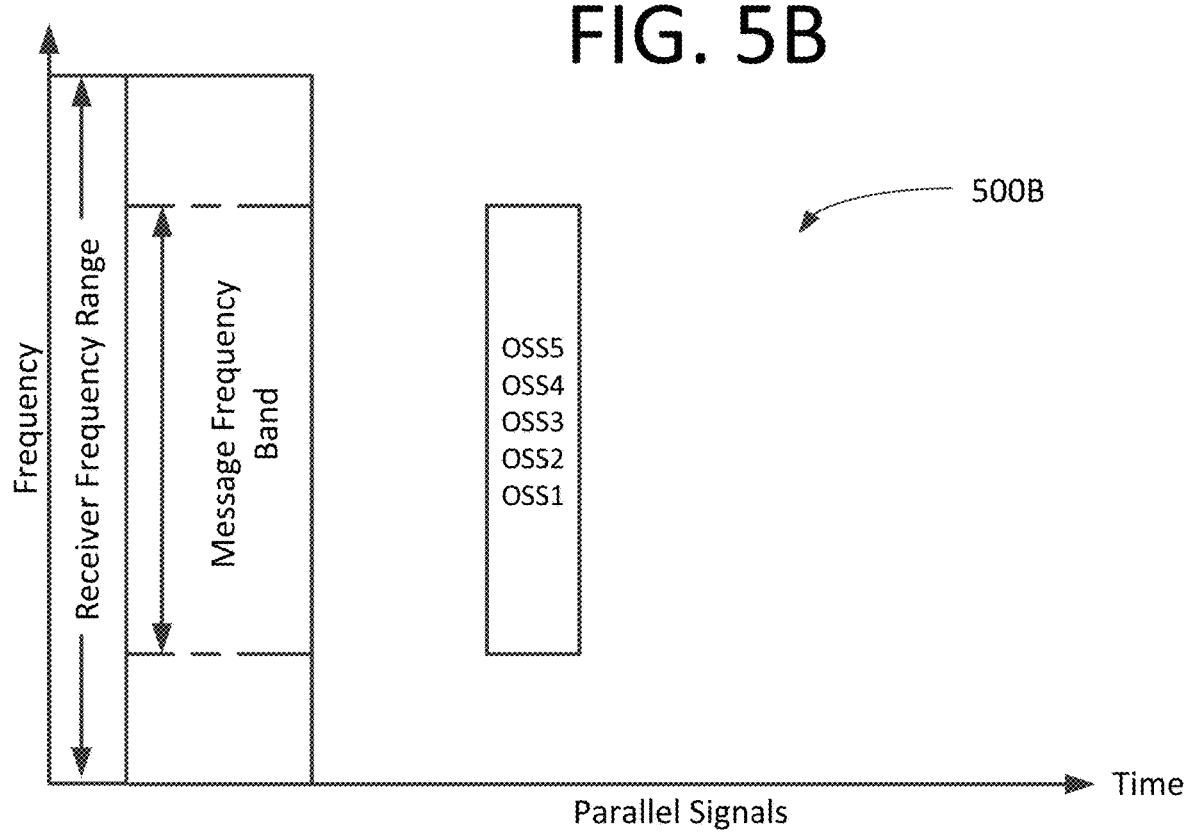

FIG. 5B shows a first multifan survey message transmission. Here, a message for ensonifying an exemplary group of five fans utilizes a spread spectrum technique such as frequency hopping with Costas codes guiding frequency selection. In particular, five orthogonal spread spectrum message components are transmitted in parallel such that each of the message components OSS1, OSS2, OSS3, OSS4, OSS5 occupies the entirety of a message frequency band that is a subset of a receiver's frequency operating range. Subset here refers to less than all of, for example one half, one third, or one fourth of a receiver's frequency operating range.

Figure 5C:
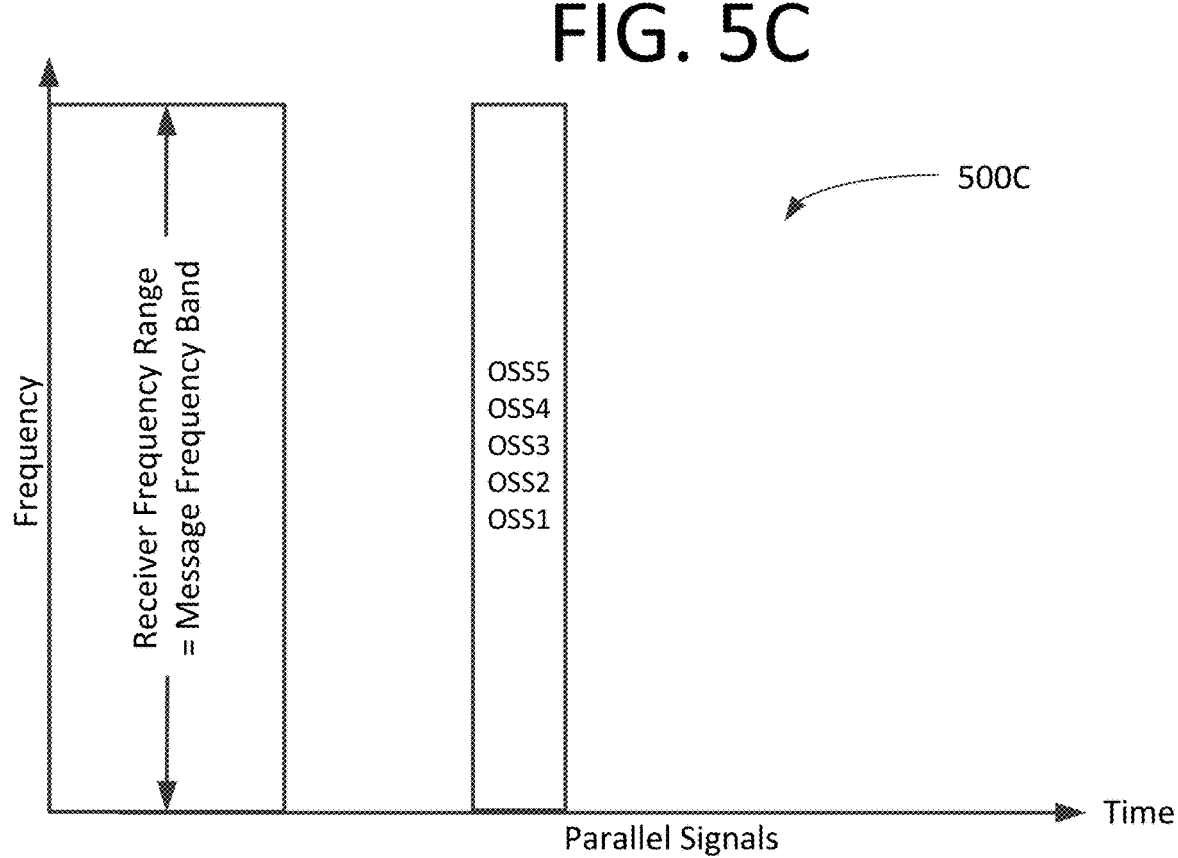

FIG. 5C shows a second multifan survey message transmission. Here, a message for ensonifying an exemplary group of five fans utilizes a spread spectrum technique such as frequency hopping with Costas codes guiding frequency selection. In particular, five orthogonal spread spectrum message components are transmitted in parallel such that each of the message components OSS1, OSS2, OSS3, OSS4, OSS5 occupies a frequency band that is substantially all of or all of a receiver's frequency operating range. This technique enables use of the receiver's entire frequency operating range for each message component as compared to techniques that utilize frequency separation to distinguish signals and thus, for a given receiver, cannot make full use of the receiver's entire frequency operating range in sending each message component.

Figure 5D:

FIG. 5D shows a third multifan survey message transmission. Here, a message for ensonifying an exemplary group of five fans utilizes a spread spectrum technique such as frequency hopping with Costas codes guiding frequency selection. In particular, five orthogonal spread spectrum message components are transmitted serially. As in FIG. 5B, each of the message components OSS1, OSS2, OSS3, OSS4, OSS5 occupies the entirety of a message frequency band that is a subset of a receiver's frequency range. Further, where a message incorporates multiple serial components, transmitter source level may be dedicated to each component such that higher energy signals result as compared with overlapping parallel signals that share source level.

Figure 5E:
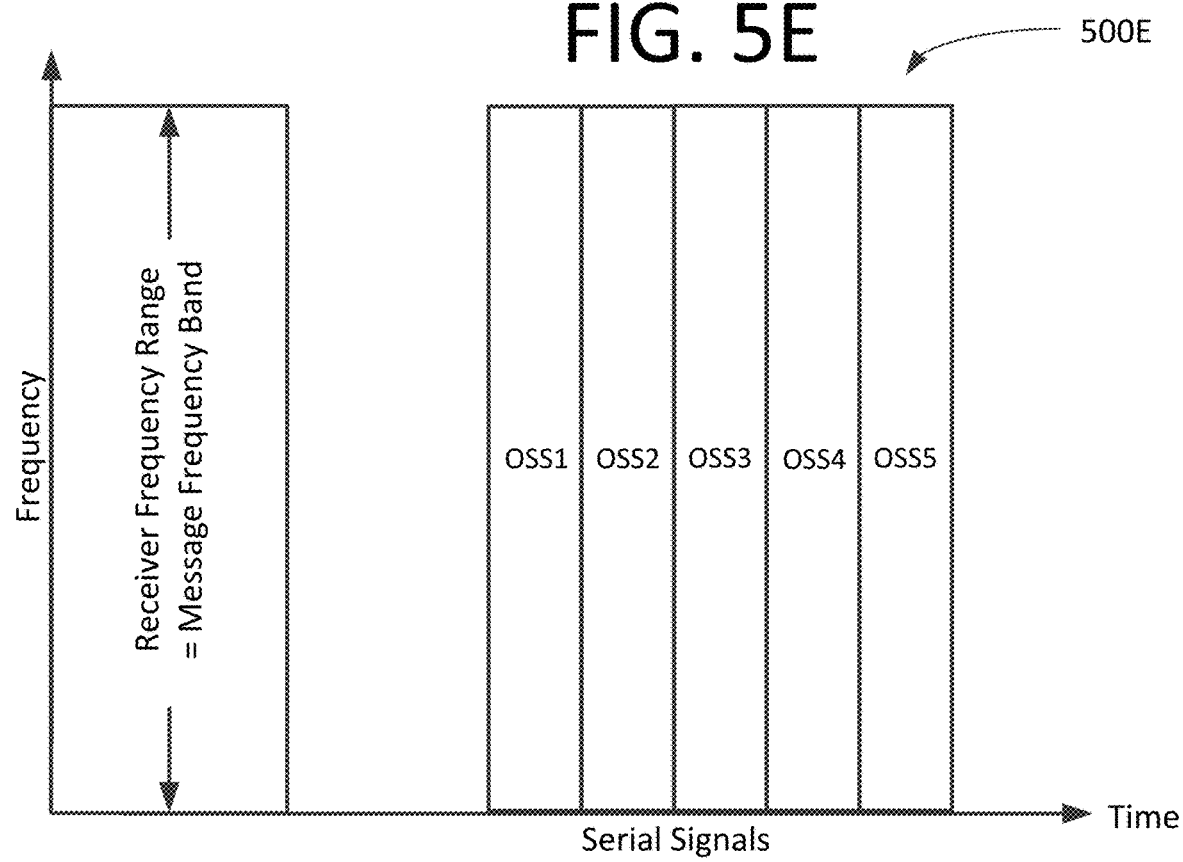

FIG. 5E shows a fourth multifan survey message transmission. Here, a message for ensonifying an exemplary group of five fans utilizes a spread spectrum technique such as frequency hopping with Costas codes guiding frequency selection. In particular, five orthogonal spread spectrum message components are transmitted serially. As in FIG. 5C, each of the message components OSS1, OSS2, OSS3, OSS4, OSS5 occupies a frequency band that is substantially all of or all of a receiver's frequency operating range.

Figure 5F:
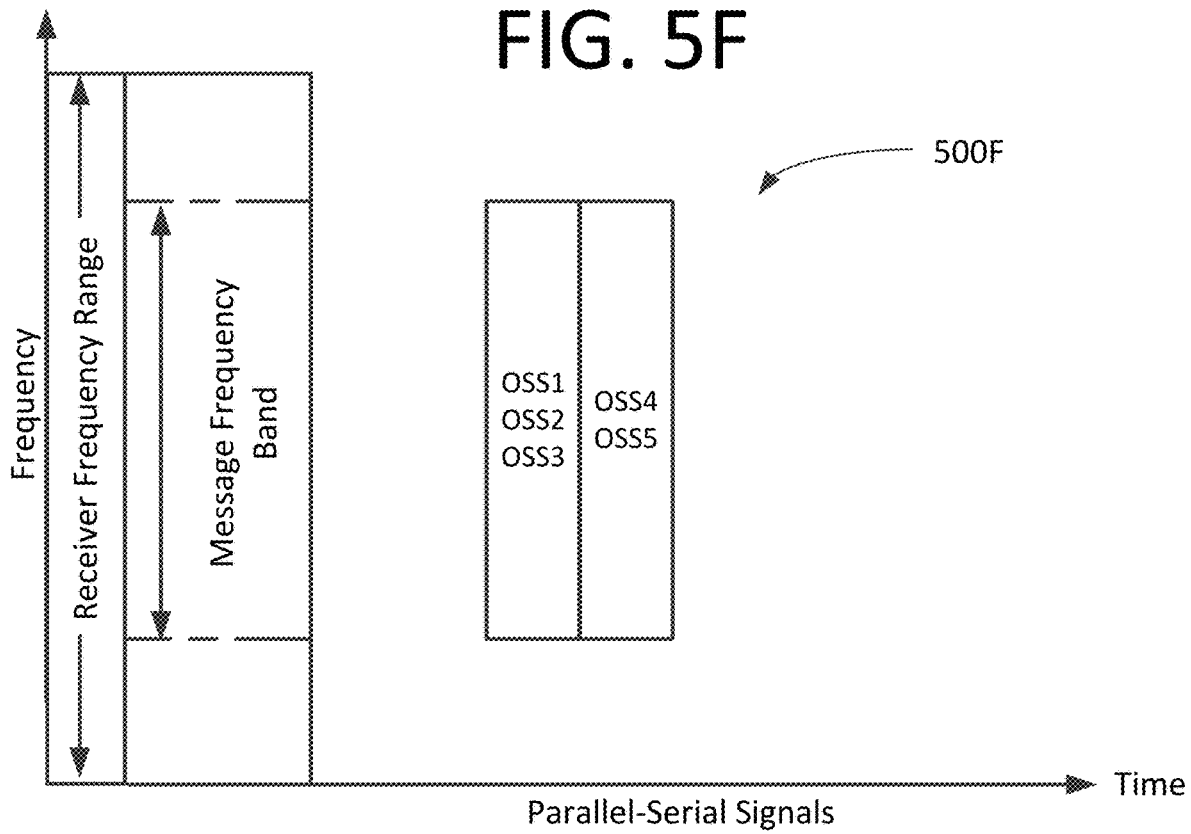

FIG. 5F shows a fifth multifan survey message transmission. Here, a message for ensonifying an exemplary group of five fans utilizes a spread spectrum technique such as frequency hopping with Costas codes guiding frequency selection. In particular, the first three of five orthogonal spread spectrum message components are transmitted in parallel. Later in time (serially) the last two message components are transmitted in parallel. Each of the message components OSS1, OSS2, OSS3, OSS4, OSS5 occupies the entirety of a message frequency band that is a subset of a receiver's frequency range.

Figure 5G:
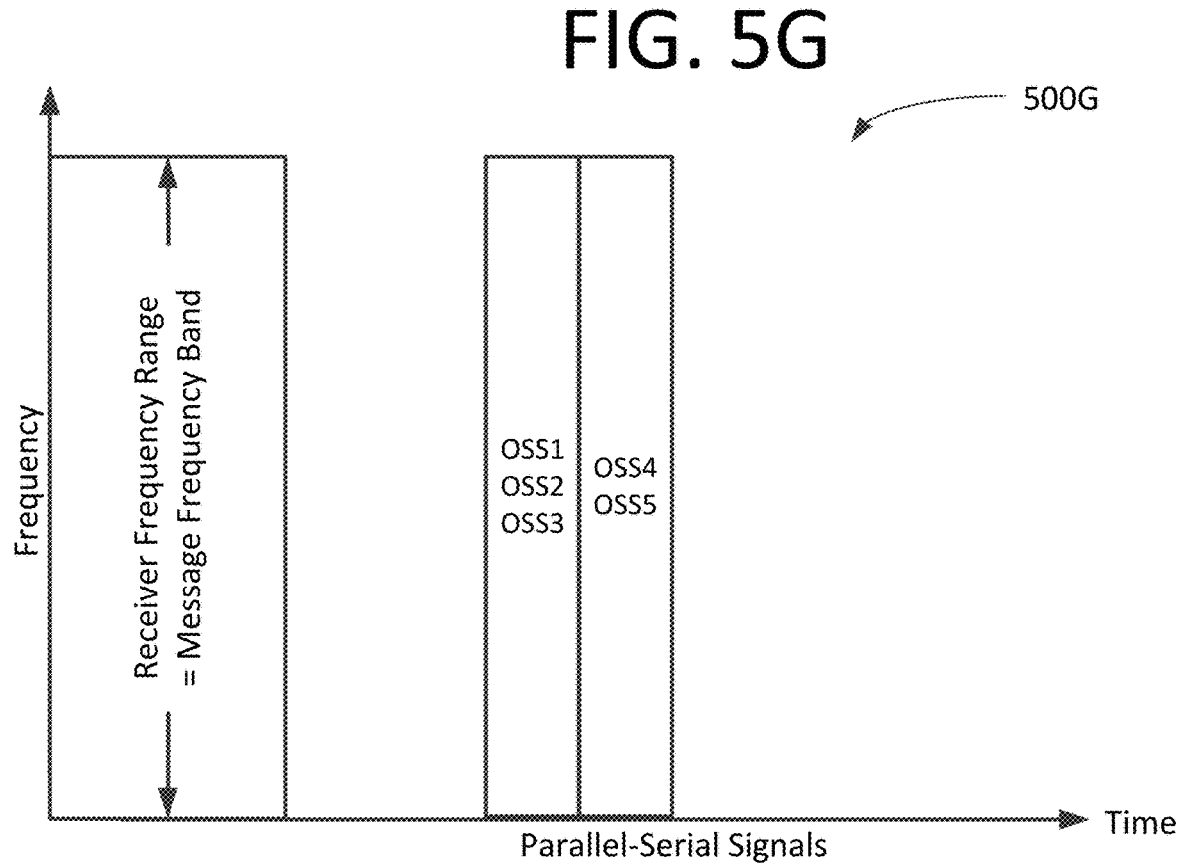

FIG. 5G shows a sixth multifan survey message transmission. Here, a message for ensonifying an exemplary group of five fans utilizes a spread spectrum technique such as frequency hopping with Costas codes guiding frequency selection. In particular, the first three of five orthogonal spread spectrum message components are transmitted in parallel. Later in time (serially) the last two message components are transmitted in parallel. Each of the message components OSS1, OSS2, OSS3, OSS4, OSS5 occupies a frequency band that is substantially all of or all of a receiver's frequency operating range.

Applicant notes that just as a frequency hopping spread spectrum sequence with Costas coded frequency selection technique may be used to construct the messages of FIGS. 5A-G, so too can the other codes and sequences of FIG. 4 be used to construct message components for inclusion in a single transmitted message that results in returns wherein the message components are separable or uniquely separable by a receiver by virtue of their varying codes. See below.

Figure 5H:
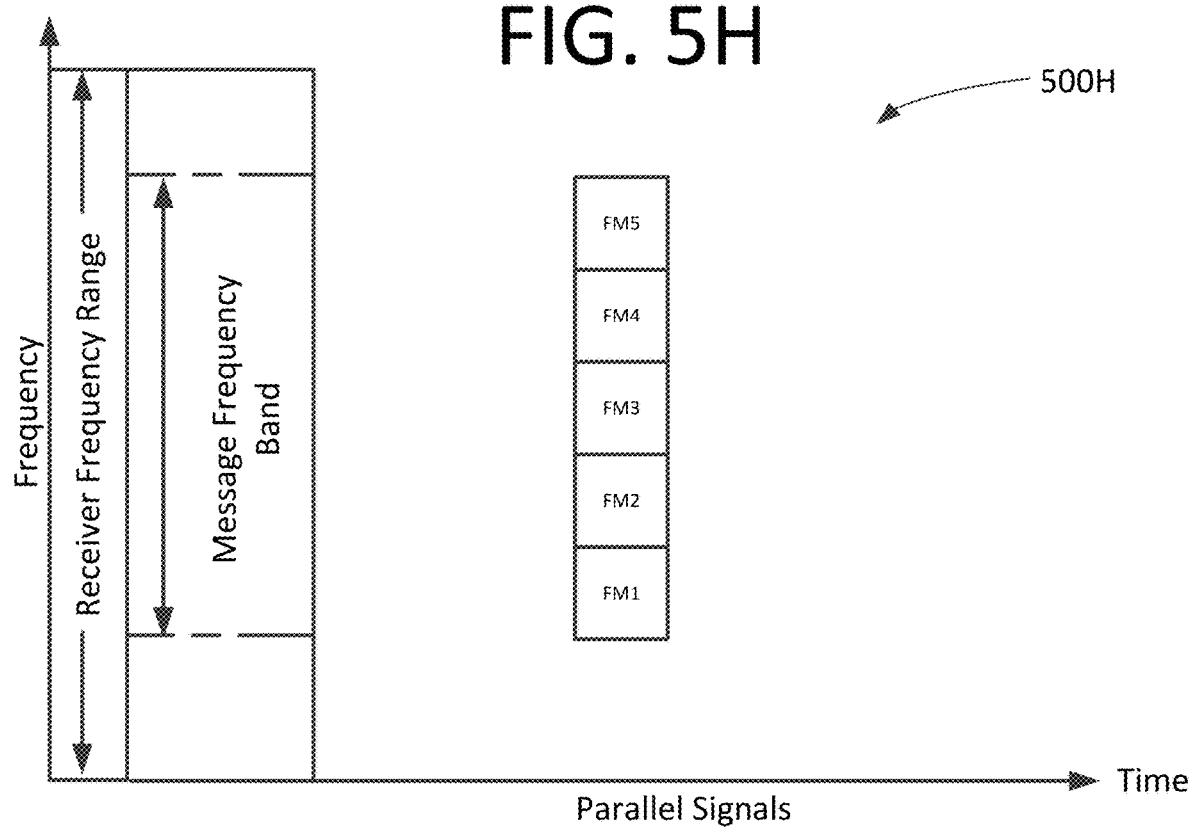
FIGS. 5H-O show various FM messages for use with the multibeam echo sounder of FIG. 1A.

FIGS. 5H-O show exemplary use 500H-O of FM codes. FIG. 5H shows use of five FM codes FM1-FM5 in a frequency band that is less than all of the available receiver frequency operating range. As shown, the codes are transmitted in parallel for ensonifying an exemplary group of five fans simultaneously. As shown, the frequency bands allotted to each FM code are contiguous and non-overlapping. Here and elsewhere, although codes FM1-FM5 are shown without any gaps between frequency bands or overlap of frequency bands, the message components' frequency bands may be non-contiguous or partially overlapping.

Figure 5I:
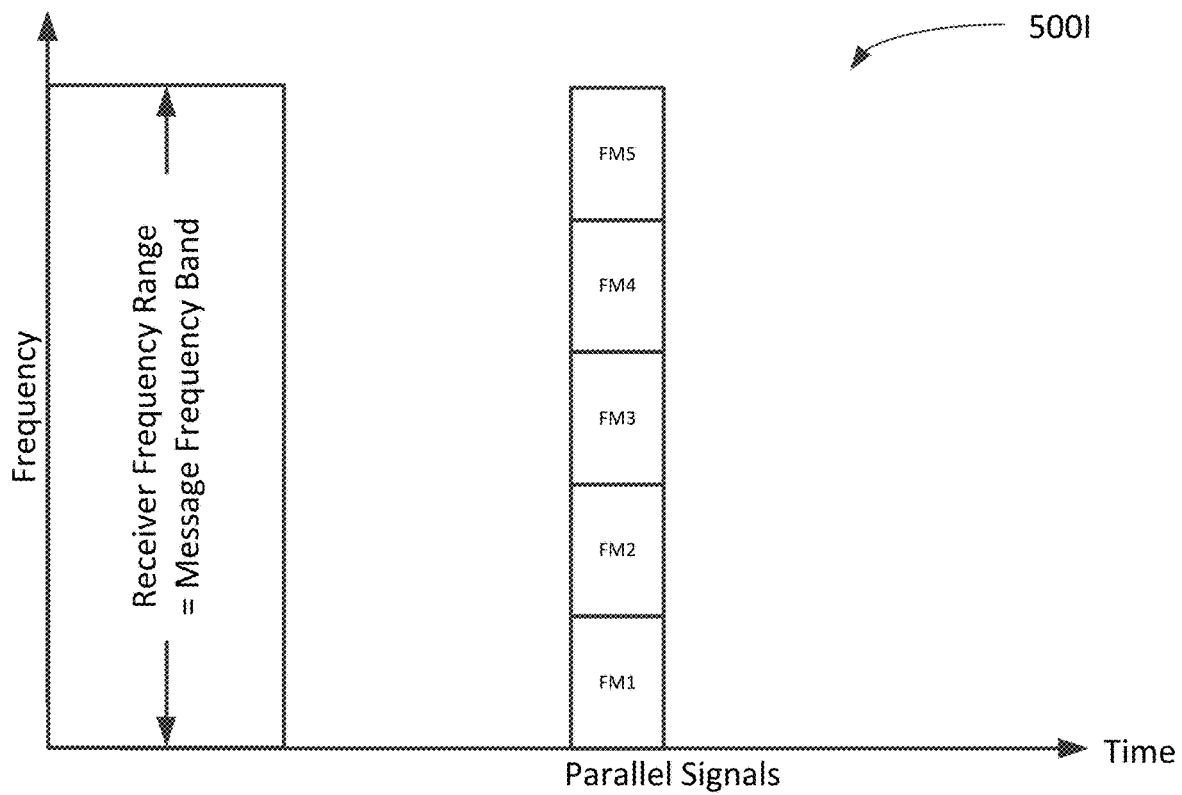

FIG. 5I shows exemplary use of several FM codes. Here, the five FM codes FM1-FM5 transmitted in parallel occupy all or substantially all of the receiver frequency operating range for ensonifying an exemplary group of five fans.

Figure 5J:
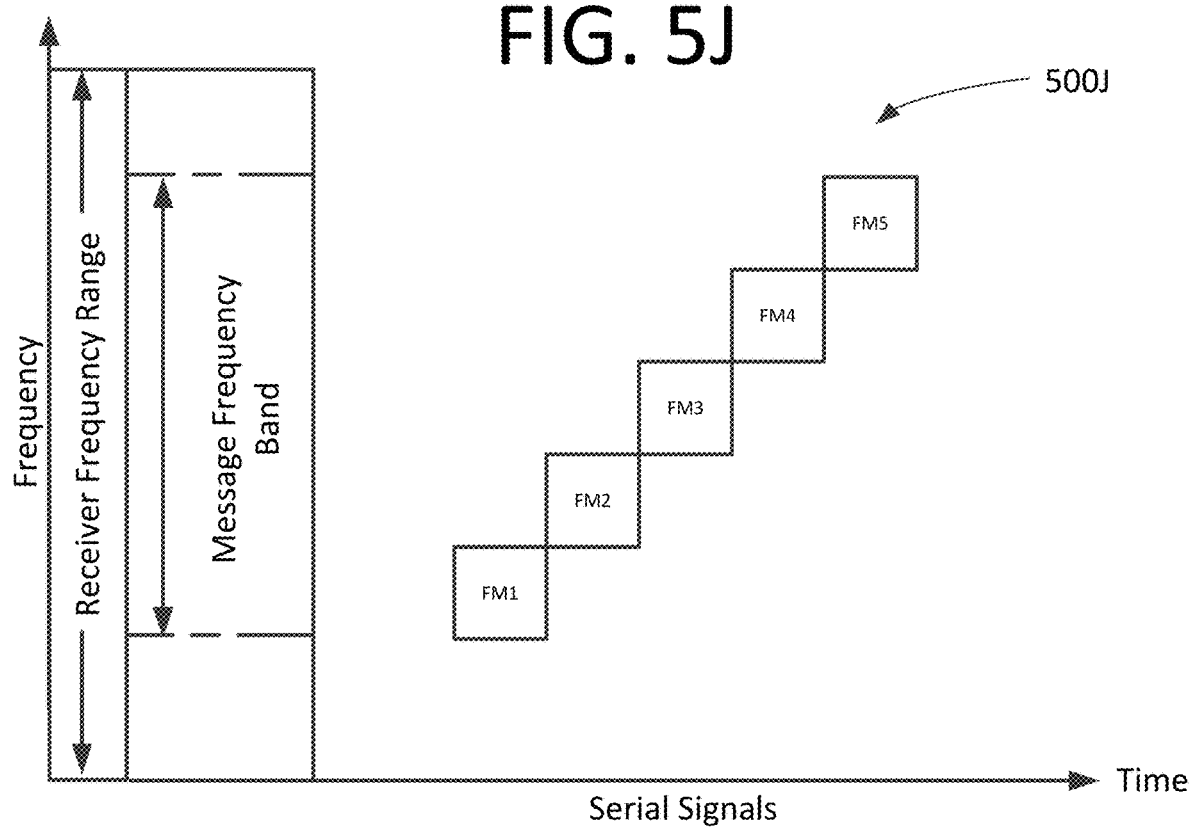

FIG. 5J shows exemplary use of FM codes. Here, the five FM codes FM1-FM5 are transmitted serially and occupy less than all of the available receiver frequency operating range for ensonifying an exemplary group of five fans. Here and elsewhere, although no temporal spacing is shown between the message components, a temporal space may be provided, for example to allow for temporal separation of codes.

Figure 5K:
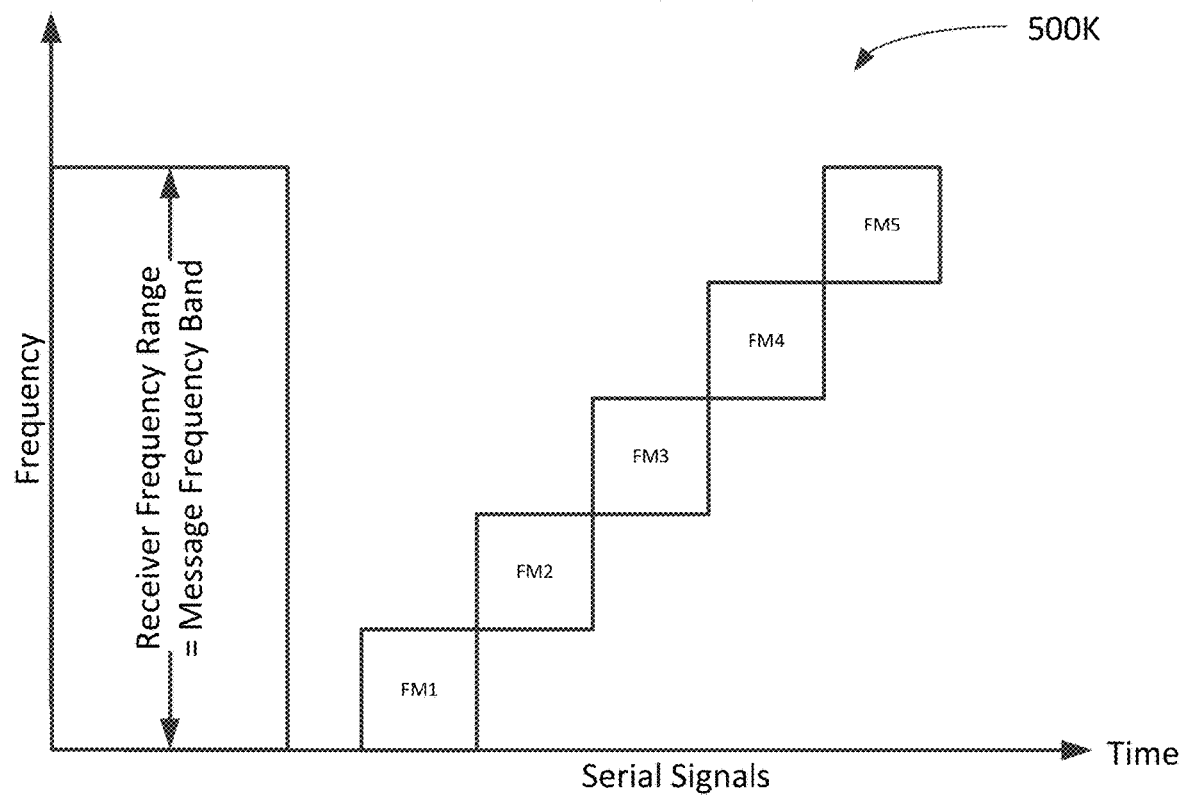

FIG. 5K shows exemplary use of FM codes. Here, the five FM codes FM1-FM5 are transmitted serially and occupy all or substantially all of the available receiver frequency operating range for ensonifying an exemplary group of five fans.

FIG. 5L-O also show use of FM codes. However, here two sweeps are used in each frequency band and each of these sweeps may be used to ensonify reflectors in two particular zones or fans.

Figure 5L:
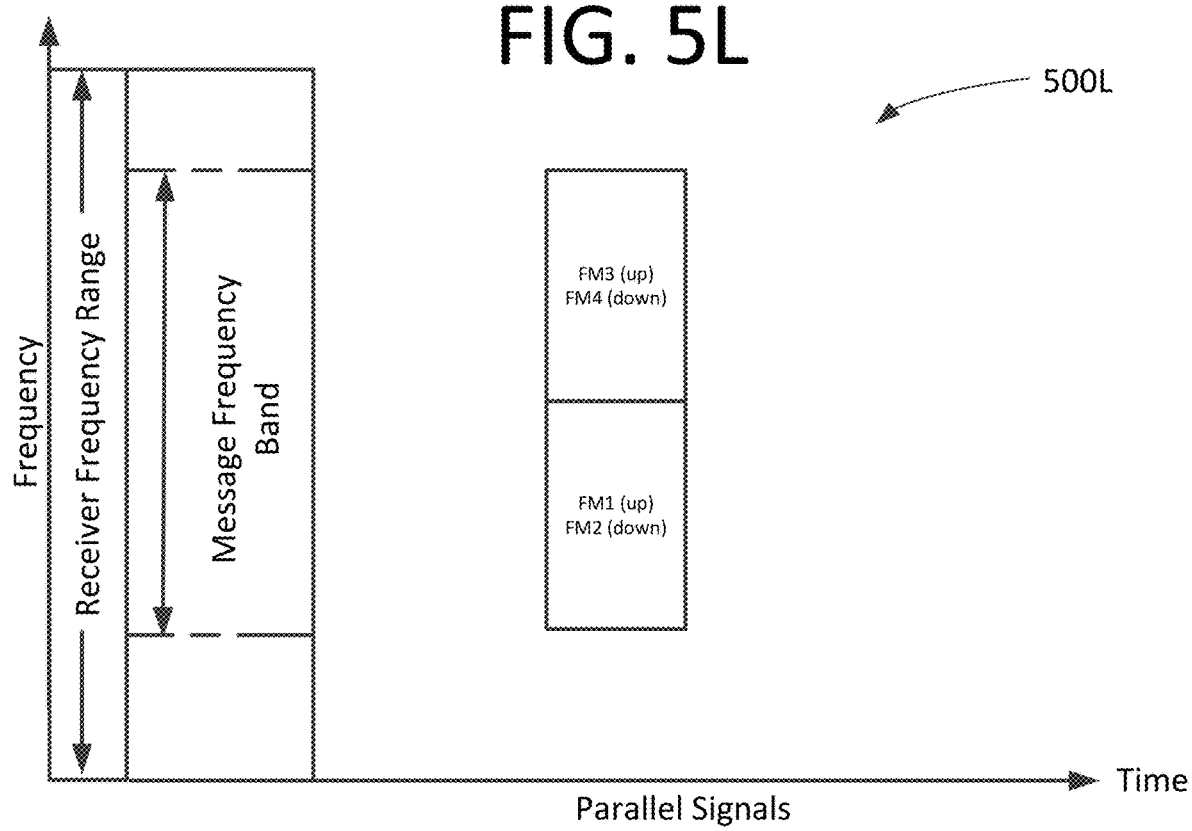

FIG. 5L shows exemplary use of FM sweep codes where directionality of the frequency sweep is exploited for signal discrimination in returns. Here, two FM sweeps (FM1, FM2) are sent in a first frequency band, where FM1 consists of an upward (increasing) frequency sweep while FM2 consists of a downward (decreasing) frequency sweep through the same frequency band as FM1. Similarly, two FM sweeps, FM3 and FM4, are sent in a second frequency band distinct from FM1, in an upward and downward direction, respectively. The transmissions in these frequency bands are sent in parallel for ensonifying an exemplary group of four fans simultaneously. Further, the two bands occupy less than all of the available receiver operating frequency range. Notably, matched filters may be used to distinguish an up sweep from a down sweep in a particular frequency band.

Figure 5M:
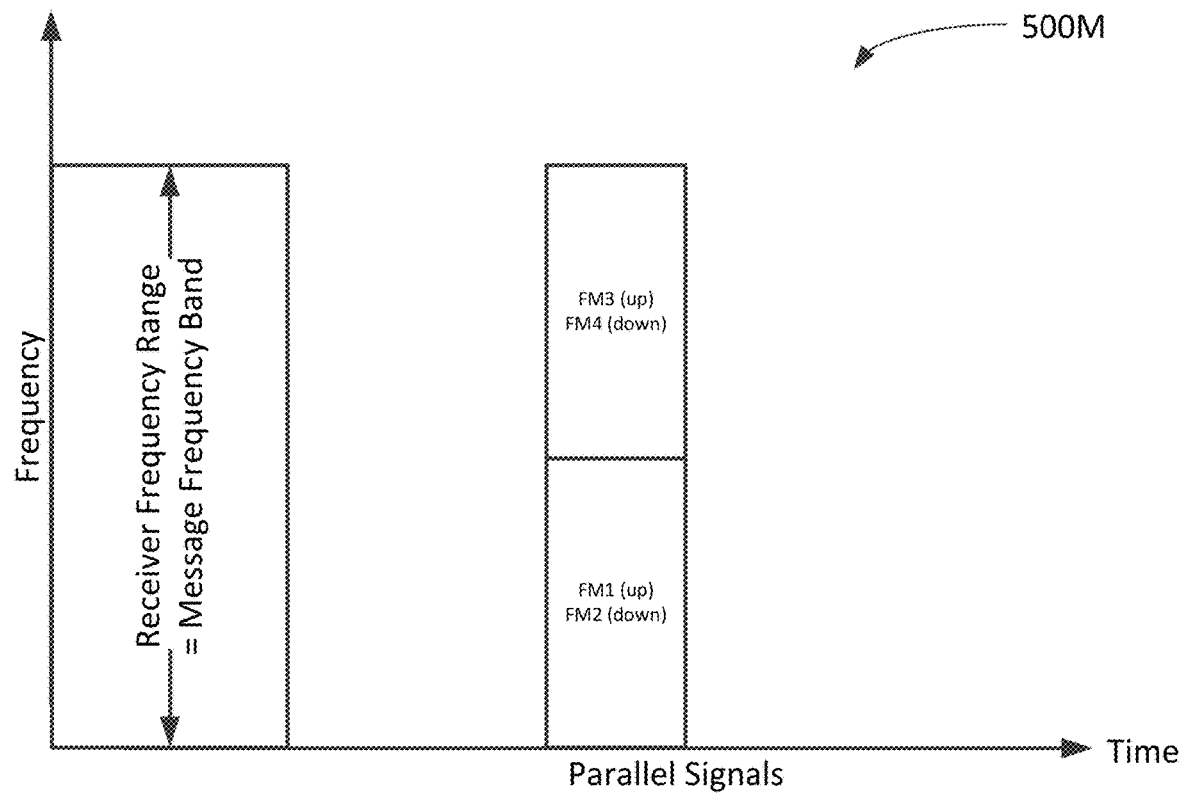

FIG. 5M shows exemplary use of FM sweep codes. Here, two FM sweeps (FM1, FM2) are sent in a first frequency band with frequency sweeps in opposite directions, and two FM sweeps (FM3, FM4) are sent in a second frequency band with frequency sweeps in opposite directions. The transmissions in these frequency bands are sent in parallel for ensonifying an exemplary group of four fans simultaneously. Further, the two bands occupy all or substantially all of the available receiver operating frequency range.

Figure 5N:
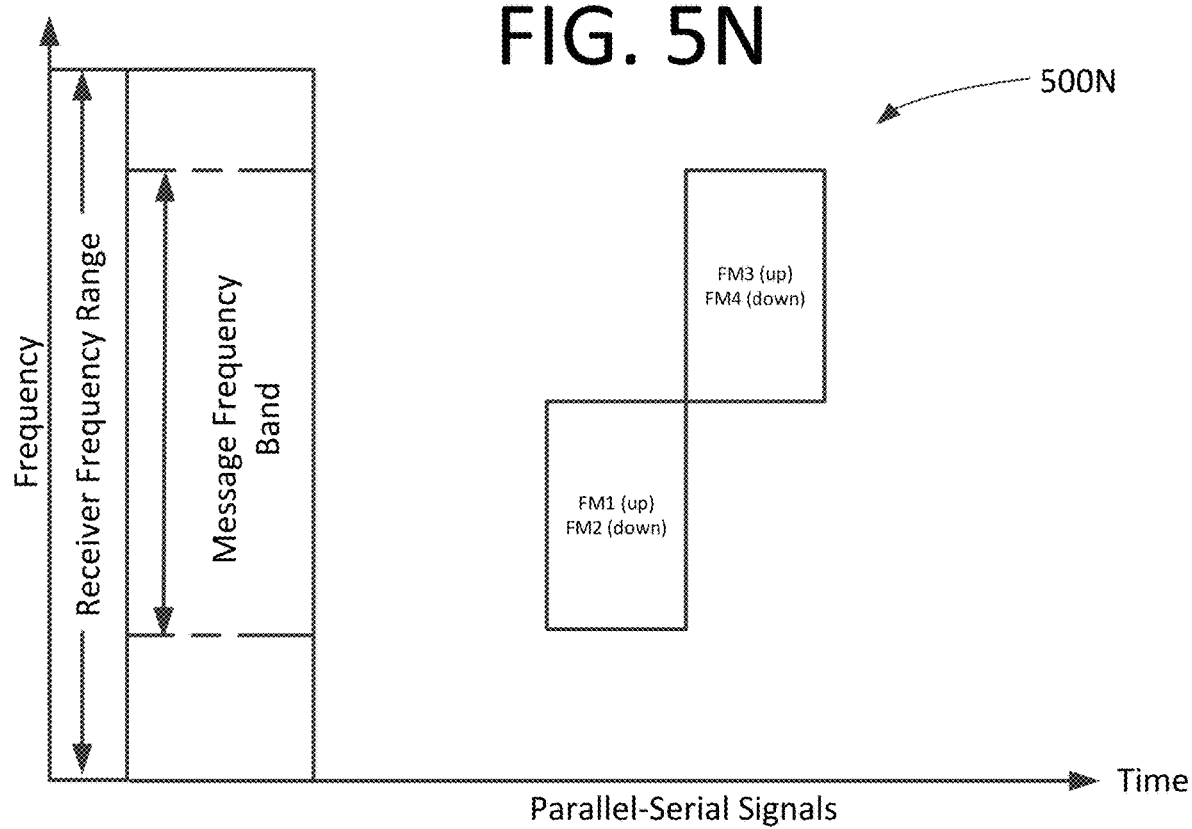

FIG. 5N shows exemplary use of FM sweep codes. Here, two FM sweeps (FM1, FM2) are sent in a first frequency band with frequency sweeps in opposite directions, and two FM sweeps (FM3, FM4) are sent in a second frequency band with frequency sweeps in opposite directions. The transmissions in the first and second frequency bands are sent serially for ensonifying an exemplary group of four fans. Further, the two bands occupy less than all of the available receiver operating frequency range.

Figure 5O:
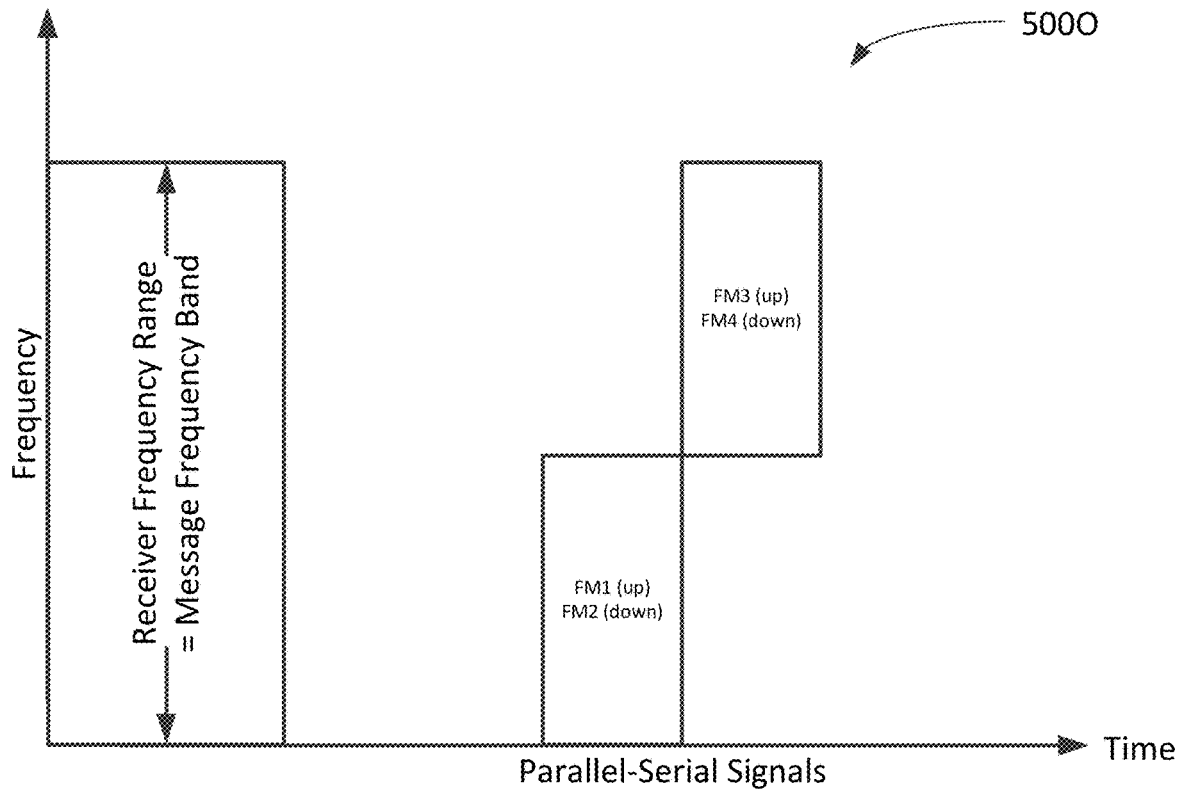

FIG. 5O shows exemplary use of FM sweep codes. Here, two FM sweeps (FM1, FM2) are sent in a first frequency band with frequency sweeps in opposite directions, and two FM sweeps (FM3, FM4) are sent in a second frequency band with frequency sweeps in opposite directions. The transmissions in the first and second frequency bands are sent serially for ensonifying an exemplary group of four fans. Further, the two bands occupy all or substantially all of the available receiver operating frequency range.

Figure 5P:
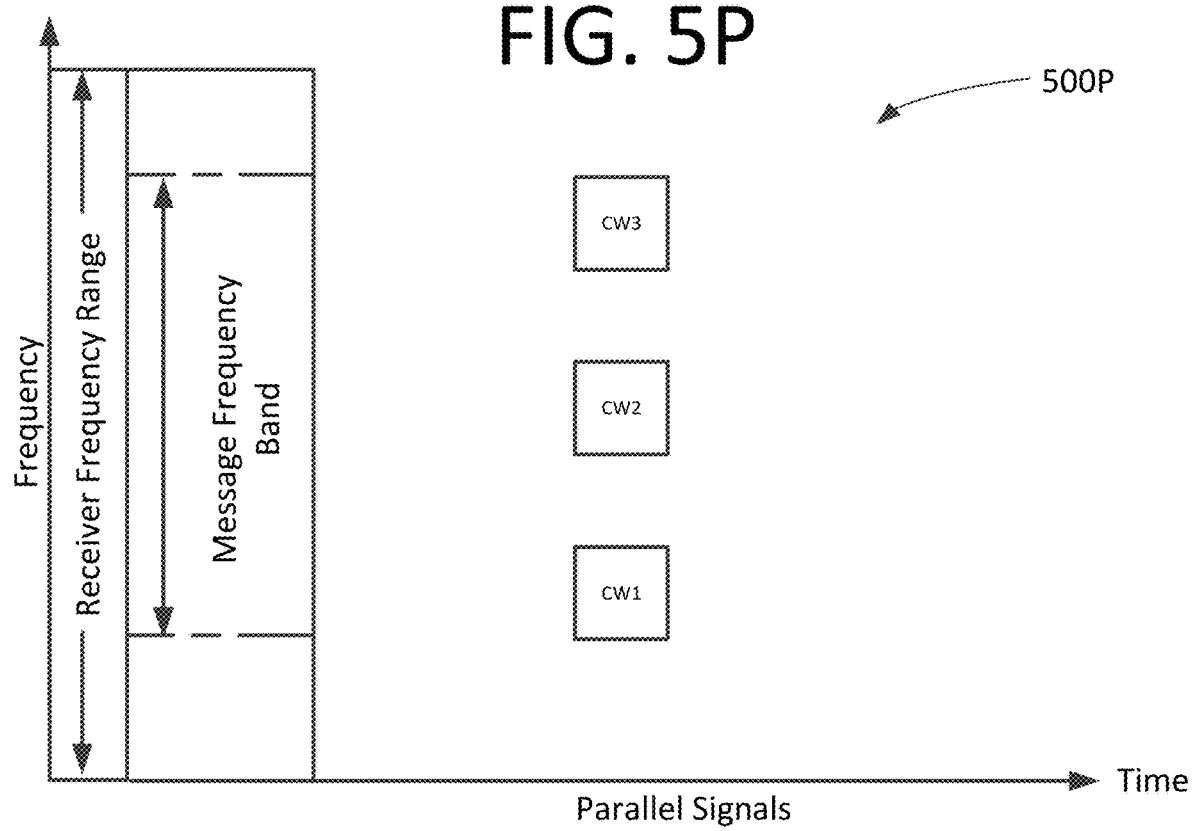
FIGS. 5P-S show various CW messages for use with the multibeam echo sounder of FIG. 1A.

FIGS. 5P-S show exemplary use of CW signals as coded signals. FIG. 5P shows use of three CW codes CW1-CW3, each occupying its own frequency band. These CW codes are not contiguous in frequency and are transmitted in parallel for ensonifying an exemplary group of three fans. The total frequency range spanned by the CW codes is less than all of the available receiver operating range. Notably, frequency gaps between the CW codes may be used for survey operations different from those using CW1-CW3.

Figure 5Q:
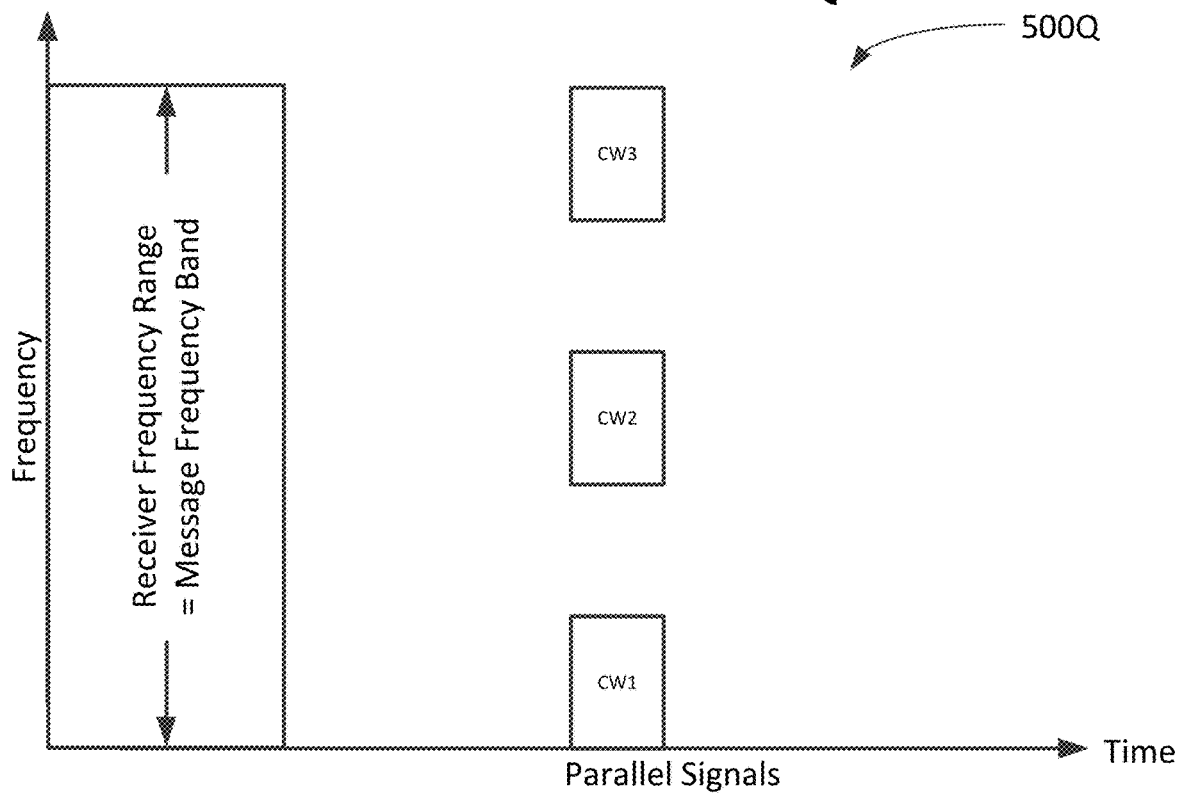

FIG. 5Q shows use of three CW codes, CW1-CW3, each occupying its own frequency band. These CW codes are not contiguous in frequency and are transmitted in parallel for ensonifying an exemplary group of three fans. The total frequency range spanned by the CW codes occupies all or substantially all of the available receiver operating frequency range. Notably, frequency gaps between the CW codes may be used for survey operations different from those using CW1-CW3.

Figure 5R:
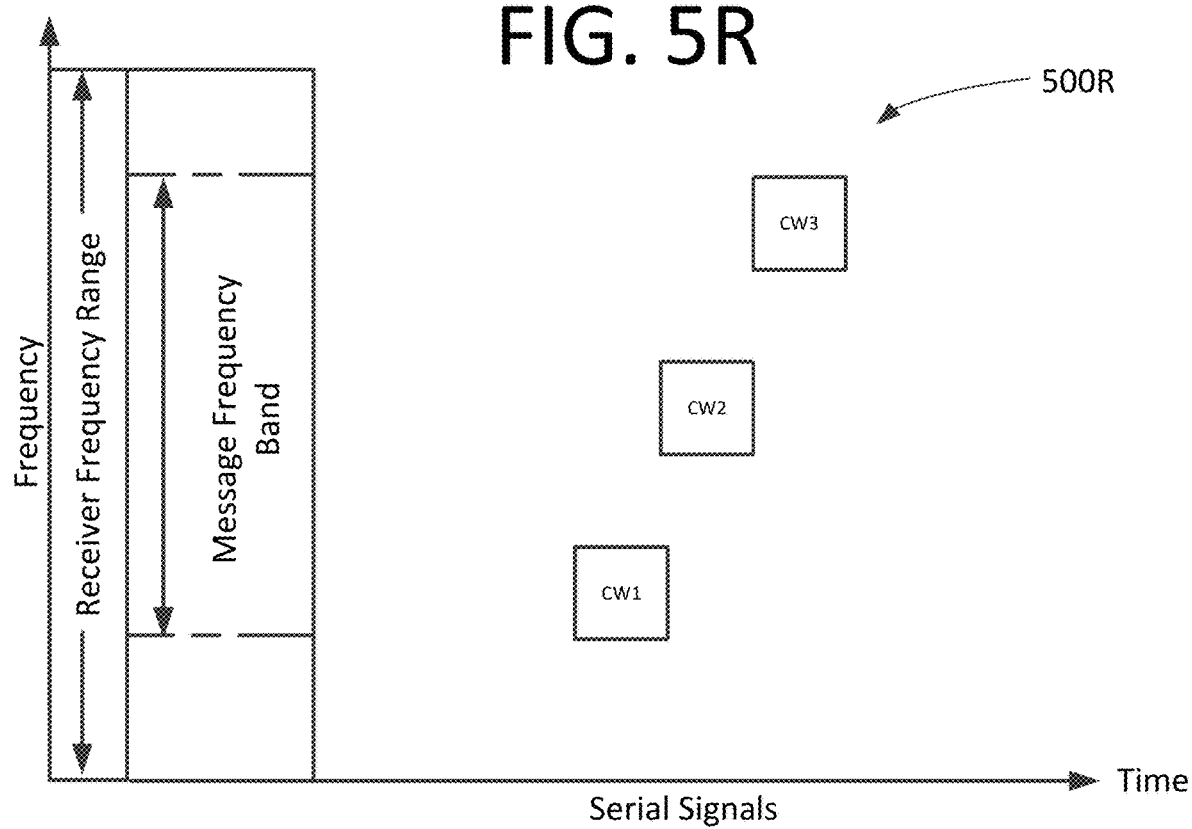

FIG. 5R shows use of three CW codes, CW1-CW3, each occupying its own frequency band. These CW codes are not contiguous in frequency and are transmitted serially for ensonifying an exemplary group of three fans. The total frequency range spanned by the CW codes is less than all of the available receiver operating range. Notably, frequency gaps between the CW codes may be used for survey operations different from those using CW1-CW3. And, although no temporal spacing is shown between the message components, a temporal space may be provided, for example to allow for temporal separation of codes.

Figure 5S:
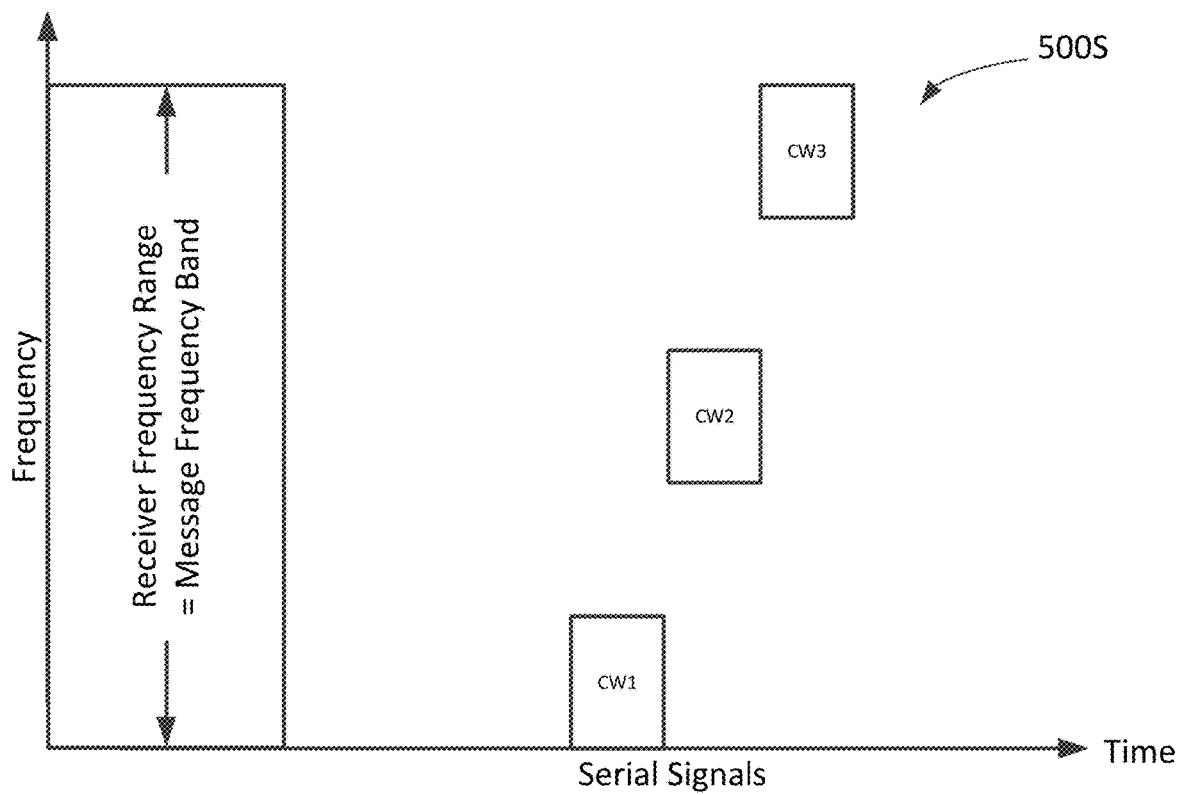

FIG. 5S shows use of three CW codes, CW1-CW3, each occupying its own frequency band. These CW codes are not contiguous in frequency and are transmitted serially for ensonifying an exemplary group of three fans. The total frequency range spanned by the CW codes occupies all or substantially all of the available receiver operating frequency range. Notably, frequency gaps between the CW codes may be used for survey operations different from those using CW1-CW3. And, although no temporal spacing is shown between the message components, a temporal space may be provided, for example to allow for temporal separation of codes.

While various embodiments of the present invention have been described above, it should be understood that they have been presented by way of example only, and not limitation. It will be apparent to those skilled in the art that various changes in the form and details can be made without departing from the spirit and scope of the invention. As such, the breadth and scope of the present invention should not be limited by the above-described exemplary embodiments, but should be defined only in accordance with the following claims and equivalents thereof.

What is claimed is:

1. Multifan equipment for survey operations such as bathymetry, water column monitoring, forward look sonar, Doppler velocimetry, Doppler current profiling, and motion stabilization, the multifan equipment comprising:
    a transmitter and a receiver of a multibeam echo sounder;
    the transmitter for constructing a message that includes N>=3 coded message components to excite projectors in a single projector array;
    each message component resulting in a particular projector array beam that ensonifies reflectors in a respective fan; and,
    following transmission of a message, the receiver for receiving ensonified reflector returns via hydrophones arranged in a single hydrophone array;
    wherein multiple hydrophone beams formed by the hydrophone array intersect the fans and fans are distinguished from each other using N filters.

2. The multifan equipment of claim 1 wherein the N filters are matched filters.

3. The multifan equipment of claim 1 wherein the N filters are band-pass filters.

4. The multifan equipment of claim 1 wherein each of the N filters includes a matched filter and a band-pass filter.

5. The multifan equipment of claim 1 wherein the projector array and the hydrophone array are linear arrays.

6. The multifan equipment of claim 1 wherein two projector arrays in a dual head configuration form the projector array and two hydrophone arrays in a dual head configuration form the hydrophone array.

7. The multifan equipment of claim 1 wherein:
    each of the N message components is processed in a respective transmit beamformer;
    signals derived from beamformer output are summed in a summation block; and,
    signals derived from the summation block outputs drive respective projectors in the projector array.

8. The multifan equipment of claim 1 wherein:
    parallel hardware pipelines in the receiver precede parallel software pipelines in the receiver;
    the hardware pipelines process T signals from T hydrophones;
    the software pipelines process input signals derived from the hardware pipeline outputs;
    in the software pipelines, each of the input signals results in output signals for each of N fans; and,
    N receiver beamformers, each beamformer driven by software pipeline outputs for a particular fan.

9. The multifan equipment of claim 8 wherein the T software pipelines include N processing strings per pipeline and each processing string in the software pipeline is for processing a signal related to a respective fan.

10. The multifan equipment of claim 1 wherein message components are derived from spread spectrum signals.

11. The multifan equipment of claim 1 wherein frequency hopping codes guide the selection of three or more frequencies characterizing each message component.

12. The multifan equipment of claim 11 wherein Costas codes guide the selection of frequencies.

13. The multifan equipment of claim 1 wherein message components are transmitted with temporal overlap.

14. The multifan equipment of claim 1 wherein message components are derived from FM signals.

15. The multifan equipment of claim 14 wherein two message components are derived from oppositely signed variations in the instantaneous frequency of two FM signals sharing a common frequency band.

16. The multifan equipment of claim 1 wherein message components are derived from CW signals with differing center frequencies.

17. A multifan survey method comprising the steps of:
    constructing a message with N>=3 message components for ensonifying reflectors in N elongated fans, each message component distinguished from other message components by a code;
    processing each message component in a respective transmit beamformer;
    driving each of plural projectors with signals derived from all of the beamformers;
    transmitting N beams from the projectors, each beam ensonifying reflectors in a respective one of the elongated fans;
    forming multiple receive beams with each of N receive beamformers, the beams intersecting the elongated fans;
    receiving returns from the reflectors via the receive beams; and,
    acquiring survey data at multiple ones of the intersections, the data at each such intersection associated with a particular fan via the message component code.

18. The method of claim 17 wherein message components are transmitted with temporal overlap.

19. The method of claim 17 wherein message components are derived from FM signals.

20. The method of claim 17 wherein two message components are derived from oppositely signed variations in the instantaneous frequency of two FM signals sharing a common frequency band.

21. The method of claim 17 wherein message components are derived from CW signals with differing center frequencies.

\* \* \* \* \*